United States Patent
Kung et al.

(10) Patent No.: US 11,032,864 B2
(45) Date of Patent: Jun. 8, 2021

(54) METHOD AND APPARATUS FOR HANDLING MULTIPLE SIDELINK COMMUNICATION IN A WIRELESS COMMUNICATION SYSTEM

(71) Applicant: ASUSTek Computer Inc., Taipei (TW)

(72) Inventors: Yi-Hsuan Kung, Taipei (TW); Li-Chih Tseng, Taipei (TW); Chun-Wei Huang, Taipei (TW); Ming-Che Li, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/985,608

(22) Filed: Aug. 5, 2020

(65) Prior Publication Data

US 2021/0045178 A1    Feb. 11, 2021

Related U.S. Application Data

(60) Provisional application No. 62/884,365, filed on Aug. 8, 2019.

(51) Int. Cl.
*H04W 76/18* (2018.01)
*H04W 80/02* (2009.01)
(Continued)

(52) U.S. Cl.
CPC ....... *H04W 76/18* (2018.02); *H04W 28/0278* (2013.01); *H04W 28/26* (2013.01);
(Continued)

(58) Field of Classification Search
None
See application file for complete search history.

(56) References Cited

U.S. PATENT DOCUMENTS

| | | | |
|---|---|---|---|
| 2016/0044737 A1* | 2/2016 | Kwon | H04W 76/19 370/328 |
| 2016/0142951 A1* | 5/2016 | Balasubramanian | H04W 36/023 370/331 |
| 2018/0013521 A1* | 1/2018 | Lee | H04L 1/1851 |
| 2019/0053253 A1* | 2/2019 | Jung | H04W 72/10 |

(Continued)

FOREIGN PATENT DOCUMENTS

| WO | 2016048082 | 3/2016 |
|---|---|---|
| WO | 2018059701 | 4/2018 |

(Continued)

OTHER PUBLICATIONS

3GPP TS 36.321 (V12.5.0), Mar. 2015 (Year: 2015).*

(Continued)

*Primary Examiner* — Kodzovi Acolatse
*Assistant Examiner* — The Hy Nguyen
(74) *Attorney, Agent, or Firm* — Skaar Ulbrich Macari, P.A.

(57) ABSTRACT

A method and device are disclosed from the perspective of a first device handling radio link failure. In one method, the method includes the first device performing or establishing sidelink unicast communication with a second device. The method also includes the first device performing or establishing sidelink unicast communication with a third device. The method also includes the first device detecting a radio link failure associated with the second device. The method further includes the first device performing a Sidelink MAC reset associated with the second device in response to the radio link failure, and not performing a Sidelink MAC reset associated with the third device.

12 Claims, 17 Drawing Sheets

(51) Int. Cl.
*H04W 92/18* (2009.01)
*H04W 28/02* (2009.01)
*H04W 28/26* (2009.01)
*H04W 72/12* (2009.01)

(52) U.S. Cl.
CPC ....... *H04W 72/1257* (2013.01); *H04W 80/02* (2013.01); *H04W 92/18* (2013.01)

(56) References Cited

U.S. PATENT DOCUMENTS

| | | | | |
|---|---|---|---|---|
| 2019/0215685 | A1* | 7/2019 | Wang | H04W 8/30 |
| 2020/0037352 | A1* | 1/2020 | Yang | H04W 72/14 |
| 2020/0045674 | A1 | 2/2020 | Tseng | |
| 2020/0092784 | A1* | 3/2020 | Hampel | H04W 72/1268 |
| 2020/0252989 | A1* | 8/2020 | Chen | H04W 76/27 |
| 2020/0252990 | A1* | 8/2020 | Ganesan | H04W 76/19 |
| 2020/0287665 | A1* | 9/2020 | Lee | H04W 28/0278 |

FOREIGN PATENT DOCUMENTS

| | | |
|---|---|---|
| WO | 2019066558 | 4/2019 |
| WO | 2020071851 | 4/2020 |
| WO | WO-2020147046 A1 * 7/2020 ............ H04W 72/04 |

OTHER PUBLICATIONS

Huawei, UL HARQ handling for LAA SCell, 3GPP TSG-RAN WG2 Meeting #93bis, R2-162430 Dubrovnik, Croatia Apr. 11-16, 2016.

European Search Report in corresponding EP Application No. 20189529.9, dated Jan. 15, 2021.

LG Electronics Inc., "MAC modeling for ProSe communication", 3GPP Draft; R2-145036 MAC Modelling for Prose Communication, 3rd Generation Partnership Project (3GPP), Mobile Competence Centre; 650, Route Des Lucioles; F-06921 Sophia-Antipolis Cedex; France.

* cited by examiner

METHOD AND APPARATUS FOR HANDLING MULTIPLE SIDELINK COMMUNICATION IN A WIRELESS COMMUNICATION SYSTEM

CROSS-REFERENCE TO RELATED APPLICATIONS

The present Application claims the benefit of U.S. Provisional Patent Application Ser. No. 62/884,365 filed on Aug. 8, 2019, the entire disclosure of which is incorporated herein in their entirety by reference.

FIELD

This disclosure generally relates to wireless communication networks, and more particularly, to a method and apparatus for handling multiple sidelink communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a first device handling radio link failure. In one method, the method includes the first device performing or establishing sidelink unicast communication with a second device. The method also includes the first device performing or establishing sidelink unicast communication with a third device. The method also includes the first device detecting a radio link failure associated with the second device. The method further includes the first device performing a Sidelink MAC reset associated with the second device in response to the radio link failure, and not performing a Sidelink MAC reset associated with the third device.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.213 V15.5.0, "NR; Physical layer procedures for control (Release 15)"; TS 38.300 V15.5.0, "NR; NR and NG-RAN Overall Description; Stage 2 (Release 15)"; TS 38.331 V15.6.0, "NR; Radio Resource Control (RRC) protocol specification (Release 15)"; TS 36.321 V15.6.0, "Evolved Universal Terrestrial Radio Access (E-UTRA); Medium Access Control (MAC) protocol specification (Release 15)"; 3GPP RAN1 #96bis meeting report; 3GPP RAN2 #106 meeting report; 3GPP RAN1 #94 meeting report; TS 23.287 V1.0.0, "Architecture enhancements for 5G System (5GS) to support Vehicle-to-Everything (V2X) services (Release 16)"; R1-1900885, "Physical layer procedures for HARQ operation for groupcast and unicast transmissions", Qualcomm, RAN1 #AH1901 meeting; R2-1907658, "Discussion on RAN1 Reply LS on SL RLM_RLF for NR V2X", LG, RAN2 #106 meeting; 3GPP RAN1 #AH1901 meeting report; R1-1907755, "Feature lead summary #2 for 7.2.4.1 Physical layer structure for sidelink", Samsung, RAN1 #97 meeting; TS 38.321 V15.6.0, "NR; Medium Access Control (MAC) protocol specification (Release 15)"; TS 36.331 V15.6.0, "Evolved Universal Terrestrial Radio Access (E-UTRA); Radio Resource Control (RRC); Protocol specification (Release 15)"; and 3GPP RAN2 #103bis meeting report. The standards and documents listed above are hereby expressly incorporated by reference in their entirety.

Figure 1:
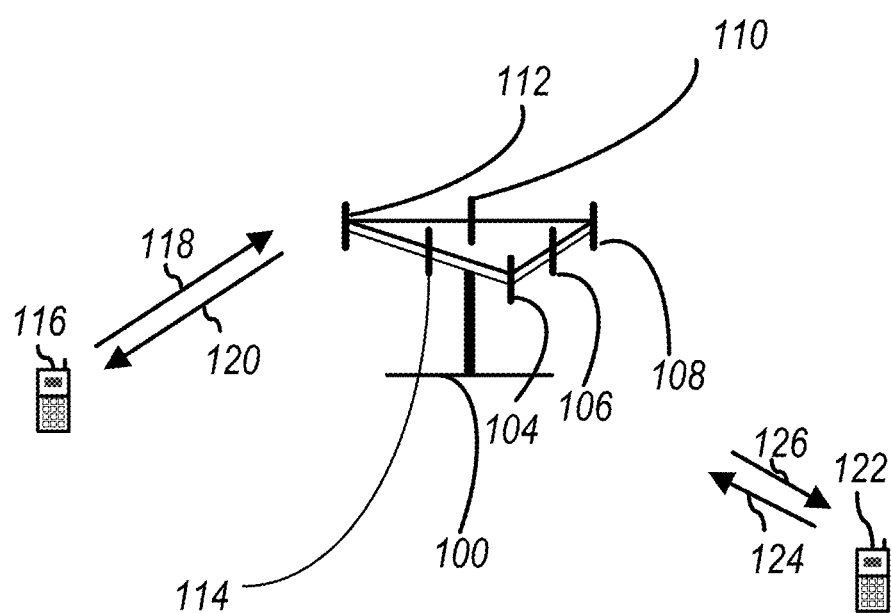
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
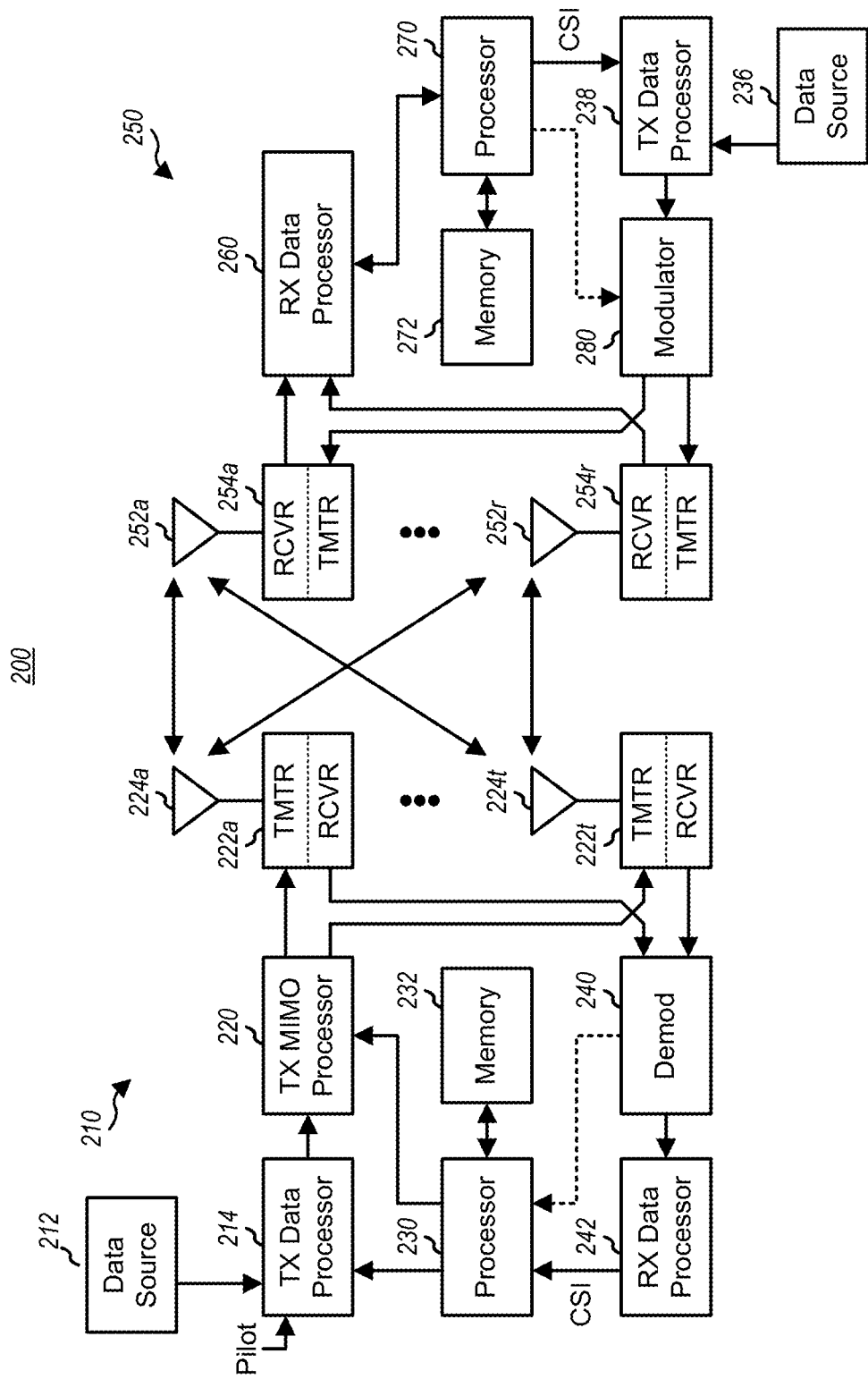
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
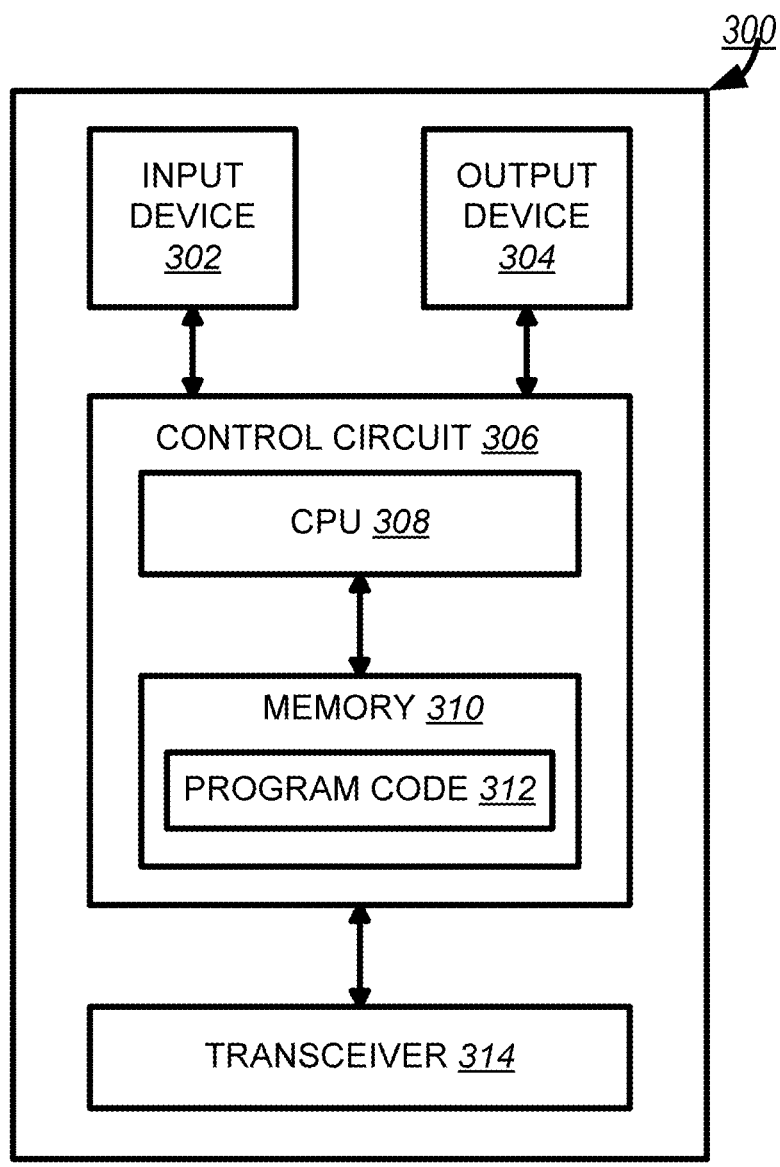
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
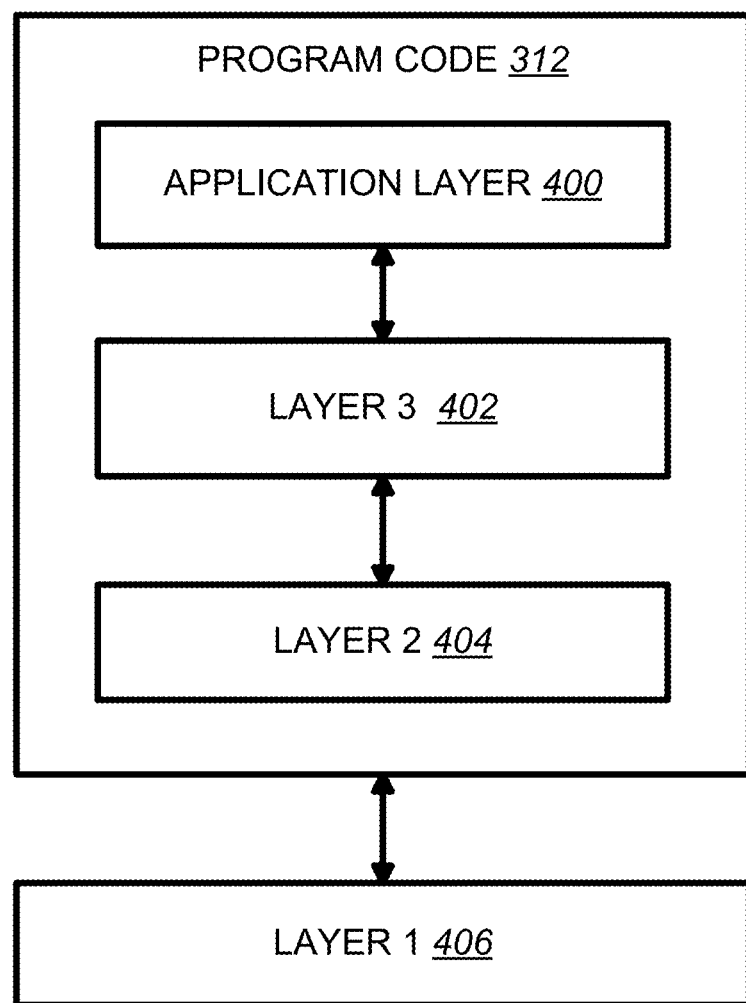
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In 3GPP TS 38.300, Radio Link monitoring and Radio Link failure is introduced as follows:
9.2.7 Radio Link Failure
In RRC_CONNECTED, the UE performs Radio Link Monitoring (RLM) in the active BWP based on reference signals (SSB/CSI-RS) and signal quality thresholds configured by the network. SSB-based RLM is based on the SSB associated to the initial DL BWP and can only be configured for the initial DL BWP and for DL BWPs containing the SSB associated to the initial DL BWP. For other DL BWPs, RLM can only be performed based on CSI-RS.

Figure 5:
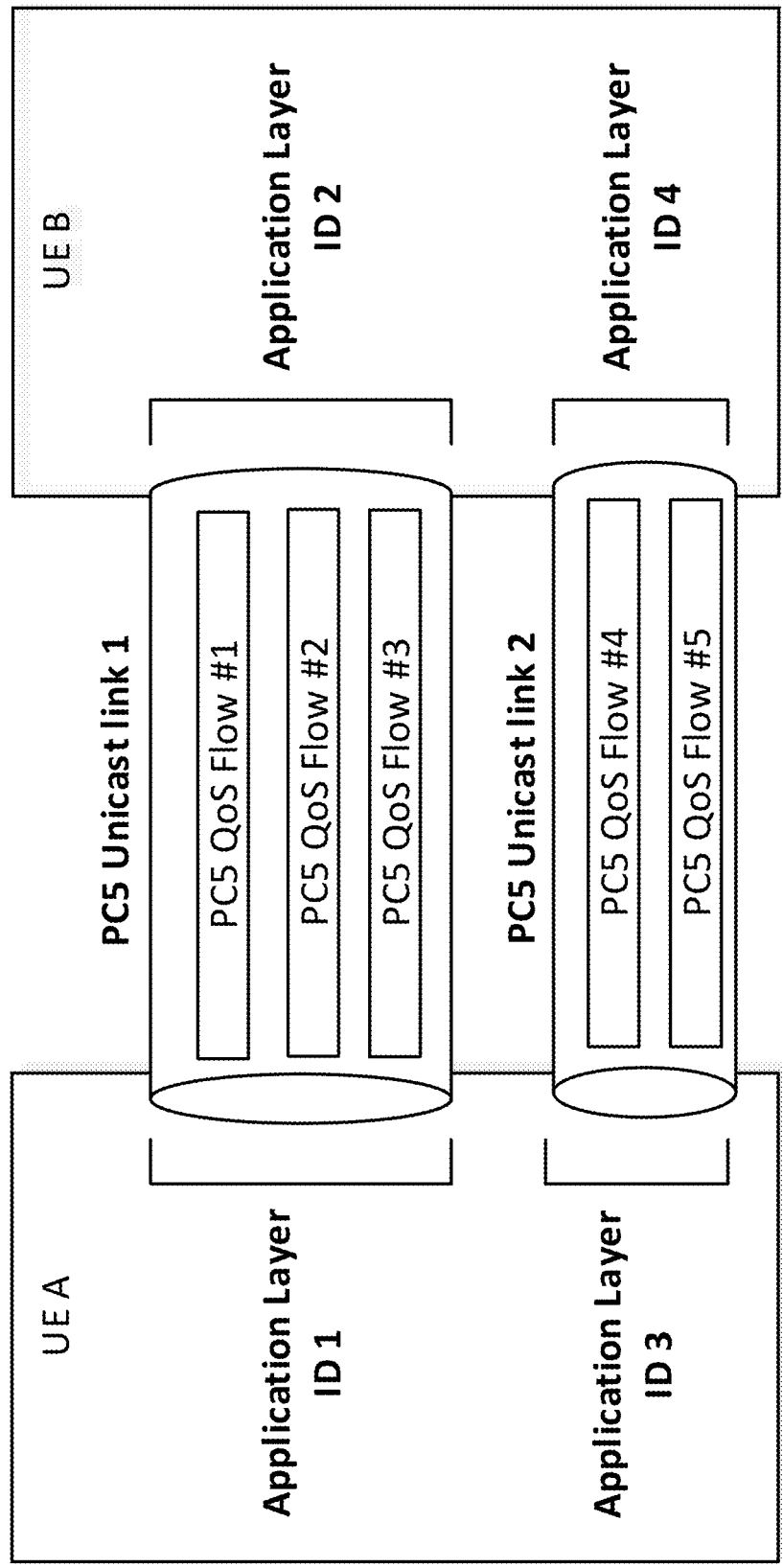
FIG. 5 is a reproduction of Figure 5.2.1.4-1 of 3GPP TS 23.287 V1.0.0.

The UE declares Radio Link Failure (RLF) when one of the following criteria are met:
 Expiry of a timer started after indication of radio problems from the physical layer (if radio problems are recovered before the timer is expired, the UE stops the timer); or
 Random access procedure failure; or
 RLC failure.
After RLF is declared, the UE:
 stays in RRC_CONNECTED;
 selects a suitable cell and then initiates RRC re-establishment;
 enters RRC_IDLE if a suitable cell was not found within a certain time after RLF was declared.
In 3GPP TS 23.287, identifiers for NR V2X (Vehicle-to-Everything) communication are introduced as follows:
5.2.1.4 Unicast Mode Communication Over PC5 Reference Point
Unicast mode of communication is only supported over NR based PC5 reference point. Figure 5.2.1.4-1 illustrates an example granularity of PC5 unicast link.

Figure 5.2.1.4-1 of 3GPP TS 23.287 V1.0.0,
Entitled "Granularity of PC5 Unicast Link", is
Reproduced as FIG. 5

The following principles apply when the V2X communication is carried over PC5 unicast link:
 The granularity of the PC5 unicast link is the same as the pair of Application Layer IDs for both UEs. Therefore, one PC5 unicast link supports one or more V2X services (e.g. PSIDs or ITS-AIDS) if the V2X services are associated with a same pair of Application Layer IDs. For example, as illustrated in Figure 5.2.1.4-1, UE A has one PC5 unicast link with a peer UE which is identified by Application Layer ID 2 and another PC5 unicast link with a peer UE which is identified by Application Layer ID 4.
 NOTE: From UE A's point of view, UE A may not know that Application Layer IDs provided by a peer UE belong to the same UE. In that case UE A doesn't have to know that multiple PC5 Unicast links are associated to the same peer UE.
 The UE may determine to establish a separate PC5 unicast link e.g. depending on network layer protocols (e.g. IP or non-IP).
 One PC5 unicast link supports one or more PC5 QoS Flows for the same or different V2X services.
 Different PC5 QoS Flows may be selected for different V2X packets as specified in clause 5.4.1.1.1.

When Application layer initiates a V2X service which requires PC5 unicast communication, the UE establishes a PC5 unicast link with the corresponding UE as specified in clause 6.3.3.1.

After successful PC5 unicast link establishment, UE A and UE B use a same pair of Layer-2 IDs for subsequent PC5-S signalling message exchange and V2X service data transmission as specified in clause 5.6.1.4. V2X layer of the transmitting UE indicates to AS layer whether the message is for PC5-S signalling message (i.e. Direct Communication Request/Accept, Link Identifier Update Request/Response, Disconnect Request/Response) or service data transmission when it sends message over the established PC5 link. V2X layer of receiving UE handles message if it is PC5-S signalling message whilst the V2X layer of receiving UE forwards the message to the upper layer if it is application data message.

The unicast mode supports per-flow QoS model as specified in clause 5.4.1.4. During the unicast link establishment, each UEs self-assign PC5 Link Identifier and associate the PC5 Link Identifier with the Unicast Link Profile for the established unicast link. The PC5 Link Identifier is a unique value within the UE. The Unicast Link Profile identified by PC5 Link Identifier includes service type(s) (e.g. PSID or ITS-AID), Application Layer ID and Layer-2 ID of UE A, Application Layer ID and Layer-2 ID of UE B and a set of PC5 QoS Flow Identifier(s) (PFI(s)). Each PFI is associated with QoS parameters (i.e. PQI and optionally Range). The PC5 Link Identifier and PFI(s) are unchanged values for the established unicast link regardless of the change of Application Layer ID and Layer-2 ID. The UE uses PFI to indicate the PC5 QoS flow to AS layer, therefore AS layer identifies the corresponding PC5 QoS flow even if the source and/or destination Layer-2 IDs are changed due to e.g. privacy support. The UE uses PC5 Link Identifier to indicate the PC5 unicast link to V2X Application layer, therefore V2X Application layer identifies the corresponding PC5 unicast link even if there are more than one unicast link associated with one service type (e.g. the UE establishes multiple unicast links with multiple UEs for a same service type).
5.6 Identifiers
5.6.1 Identifiers for V2X Communication Over PC5 Reference Point
5.6.1.1 General
Each UE has one or more Layer-2 IDs for V2X communication over PC5 reference point, consisting of:
 Source Layer-2 ID(s); and
 Destination Layer-2 ID(s).
Source and destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames.

The selection of the source and destination Layer-2 ID(s) by a UE depends on the communication mode of V2X communication over PC5 reference point for this layer-2 link, as described in clauses 5.6.1.2, 5.6.1.3, and 5.6.1.4. The source Layer-2 IDs may differ between different communication modes.

When IP-based V2X communication is supported, the UE configures a link local IPv6 address to be used as the source IP address, as defined in clause 4.5.3 of TS 23.303 [17]. The UE may use this IP address for V2X communication over PC5 reference point without sending Neighbour Solicitation and Neighbour Advertisement message for Duplicate Address Detection.

If the UE has an active V2X application that requires privacy support in the current Geographical Area, as identified by configuration described in clause 5.1.2.1, in order to ensure that a source UE (e.g. vehicle) cannot be tracked or identified by any other UEs (e.g. vehicles) beyond a certain short time-period required by the application, the source Layer-2 ID shall be changed over time and shall be randomized. For IP-based V2X communication over PC5 reference point, the source IP address shall also be changed over time and shall be randomized. The change of the identifiers of a source UE must be synchronized across layers used for PC5, e.g. when the application layer identifier changes, the source Layer-2 ID and the source IP address need to be changed.

5.6.1.2 Identifiers for Broadcast Mode V2X Communication Over PC5 Reference Point For broadcast mode of V2X communication over PC5 reference point, the UE is configured with the destination Layer-2 ID(s) to be used for V2X services. The destination Layer-2 ID for a V2X communication is selected based on the configuration as described in clause 5.1.2.1.

The UE self-selects a source Layer-2 ID. The UE may use different source Layer-2 IDs for different types of PC5 reference points, i.e. LTE based PC5 and NR based PC5.

5.6.1.3 Identifiers for Groupcast Mode V2X Communication Over PC5 Reference Point For groupcast mode of V2X communication over PC5 reference point, the V2X application layer may provide group identifier information. When the group identifier information is provided by the V2X application layer, the UE converts the provided group identifier into a destination Layer-2 ID. When the group identifier information is not provided by the V2X application layer, the UE determines the destination Layer-2 ID based on configuration of the mapping between service type (e.g. PSID/ITS-AID) and Layer-2 ID, as specified in clause 5.1.2.1.

NOTE: The mechanism for converting the V2X application layer provided group identifier to the destination Layer-2 ID is defined in Stage 3.

The UE self-selects a source Layer-2 ID.

Editor's note: Further updates of the identifiers description may be required based on RAN WG feedback.

5.6.1.4 Identifiers for Unicast Mode V2X Communication Over PC5 Reference Point

For unicast mode of V2X communication over PC5 reference point, the destination Layer-2 ID used depends on the communication peer, which is discovered during the establishment of the unicast link. The initial signalling for the establishment of the unicast link may use a default destination Layer-2 ID associated with the service type (e.g. PSID/ITS-AID) configured for unicast link establishment, as specified in clause 5.1.2.1. During the unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE needs to maintain a mapping between the Application Layer IDs and the source Layer-2 IDs used for the unicast links, as the V2X application layer does not use the Layer-2 IDs. This allows the change of source Layer-2 ID without interrupting the V2X applications.

When Application Layer IDs change, the source Layer-2 ID(s) of the unicast link(s) shall be changed if the link(s) was used for V2X communication with the changed Application Layer IDs.

A UE may establish multiple unicast links with a peer UE and use the same or different source Layer-2 IDs for these unicast links.

6.3.2 Groupcast Mode V2X Communication Over PC5 Reference Point

To perform groupcast mode of V2X communication over PC5 reference point, the UE is configured with the related information as described in clause 5.1.2.1.

Figure 6:
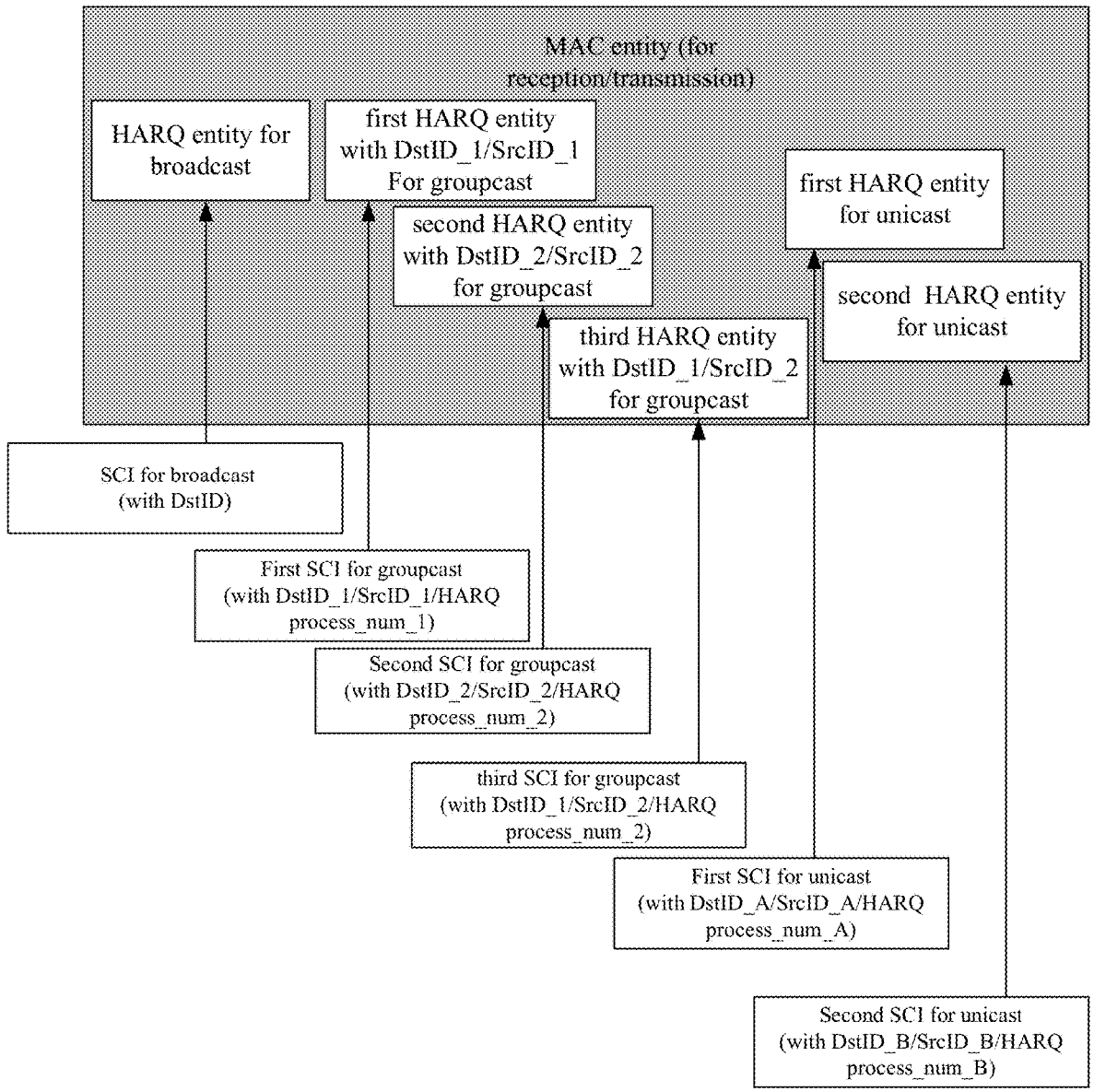
FIG. 6 is a diagram according to one exemplary embodiment.

Figure 6.3.2-1 shows the procedure for groupcast mode of V2X communication over PC5 reference point.

1. V2X group management is carried out by the V2X application layer and is out of scope of this specification.

2. The V2X application layer may provide group identifier information (i.e. an Application-layer V2X Group identifier) as specified in clause 5.6.1.3.

The V2X application layer may provide service requirements for this communication.

3. Transmitting UE determines a source Layer-2 ID and a destination Layer-2 ID and Receiving UE(s) determine destination Layer-2 ID, as specified in clauses 5.6.1.1 and 5.6.1.3.

The destination Layer-2 ID is passed down to the AS layer of Receiving UE(s) for the group communication reception.

Transmitting UE determines the PC5 QoS parameters for this groupcast as specified in clauses 5.4.1.1 and 5.4.1.3.

4. Transmitting UE has a V2X service associated with this group communication.

Transmitting UE sends the V2X service data using the source Layer-2 ID and the destination Layer-2 ID.

NOTE: In step 4, there is only one groupcast message from the transmitting UE

In 3GPP TS 38.331, Radio link failure determination is introduced as follows:

5.3.10 Radio Link Failure Related Actions 5.3.10.1 Detection of Physical Layer Problems in RRC_CONNECTED The UE shall:

1> upon receiving N310 consecutive "out-of-sync" indications for the SpCell from lower layers while neither T300, T301, T304, T311 nor T319 are running:

2> start timer T310 for the corresponding SpCell.

5.3.10.2 Recovery of Physical Layer Problems

Upon receiving N311 consecutive "in-sync" indications for the SpCell from lower layers while T310 is running, the UE shall:

1> stop timer T310 for the corresponding SpCell.

NOTE 1: In this case, the UE maintains the RRC connection without explicit signalling, i.e. the UE maintains the entire radio resource configuration.

NOTE 2: Periods in time where neither "in-sync" nor "out-of-sync" is reported by L1 do not affect the evaluation of the number of consecutive "in-sync" or "out-of-sync" indications.

5.3.10.3 Detection of Radio Link Failure

The UE shall:

1> upon T310 expiry in PCell; or
1> upon random access problem indication from MCG MAC while neither T300, T301, T304, T311 nor T319 are running; or
1> upon indication from MCG RLC that the maximum number of retransmissions has been reached:
   2> if the indication is from MCG RLC and CA duplication is configured and activated, and for the corresponding logical channel allowedServingCells only includes SCell(s):
      3> initiate the failure information procedure as specified in 5.7.5 to report RLC failure.
   2> else:
      3> consider radio link failure to be detected for the MCG i.e. RLF;
      3> if AS security has not been activated:
         4> perform the actions upon going to RRC_IDLE as specified in 5.3.11, with release cause 'other';
      3> else if AS security has been activated but SRB2 and at least one DRB have not been setup:
         4> perform the actions upon going to RRC_IDLE as specified in 5.3.11, with release cause 'RRC connection failure';
      3> else:
         4> initiate the connection re-establishment procedure as specified in 5.3.7.

The UE shall:

1> upon T310 expiry in PSCell; or
1> upon random access problem indication from SCG MAC; or
1> upon indication from SCG RLC that the maximum number of retransmissions has been reached:
   2> if the indication is from SCG RLC and CA duplication is configured and activated; and for the corresponding logical channel allowedServingCells only includes SCell(s):
      3> initiate the failure information procedure as specified in 5.7.5 to report RLC failure.
   2> else:
      3> consider radio link failure to be detected for the SCG, i.e. SCG RLF;
      3> initiate the SCG failure information procedure as specified in 5.7.3 to report SCG radio link failure.

5.3.7 RRC Connection Re-Establishment

5.3.7.2 Initiation

The UE initiates the procedure when one of the following conditions is met:

1> upon detecting radio link failure of the MCG, in accordance with 5.3.10; or
1> upon re-configuration with sync failure of the MCG, in accordance with sub-clause 5.3.5.8.3; or
1> upon mobility from NR failure, in accordance with sub-clause 5.4.3.5; or
1> upon integrity check failure indication from lower layers concerning SRB1 or SRB2, except if the integrity check failure is detected on the RRCReestablishment message; or
1> upon an RRC connection reconfiguration failure, in accordance with sub-clause 5.3.5.8.2.

Upon initiation of the procedure, the UE shall:

1> stop timer T310, if running;
1> stop timer T304, if running;
1> start timer T311;
1> suspend all RBs, except SRB0;
1> reset MAC;
1> release the MCG SCell(s), if configured;
1> release spCellConfig, if configured;
1> if MR-DC is configured:
   2> perform MR-DC release, as specified in section 5.3.5.10;
1> release delayBudgetReportingConfig, if configured, and stop timer T342, if running;
1> release overheatingAssistanceConfig, if configured, and stop timer T345, if running;
1> perform cell selection in accordance with the cell selection process as specified in TS 38.304 [20], clause 5.2.6.

5.3.11 UE Actions Upon Going to RRC_IDLE

The UE shall:

1> reset MAC;
1> if going to RRC_IDLE was triggered by reception of the RRCRelease message including a waitTime:
   2> if T302 is running:
      3> stop timer T302;
   2> start timer T302 with the value set to the waitTime;
   2> inform upper layers that access barring is applicable for all access categories except categories '0' and '2'.
1> else:
   2> if T302 is running:
      3> stop timer T302;
      3> perform the actions as specified in 5.3.14.4;
1> if T390 is running:
   2> stop timer T390 for all access categories;
   2> perform the actions as specified in 5.3.14.4;
1> if the UE is leaving RRC_INACTIVE:
   2> if going to RRC_IDLE was not triggered by reception of the RRCRelease message:
      3> if stored, discard the cell reselection priority information provided by the cellReselectionPriorities;
      3> stop the timer T320, if running;
1> stop all timers that are running except T302, T320 and T325;
1> discard the UE Inactive AS context, if any;
1> release the suspendConfig, if configured;
1> set the variable pendingRnaUpdate to false, if that is set to true;
1> discard the $K_{gNB}$ key, the S-$K_{gNB}$ key, the S-$K_{eNB}$ key, the $K_{RRCenc}$ key, the $K_{RRCint}$ key, the $K_{UPint}$ key and the $K_{UPenc}$ key, if any;
1> release all radio resources, including release of the RLC entity, the MAC configuration and the associated PDCP entity and SDAP for all established RBs;
1> indicate the release of the RRC connection to upper layers together with the release cause;
1> enter RRC_IDLE and perform cell selection as specified in TS 38.304 [20], except if going to RRC_IDLE was triggered by inter-RAT cell reselection while the UE is in RRC_INACTIVE or selecting an inter-RAT cell while T311 was running;

In 3GPP TS 36.321, Sidelink data transmission and reception are introduced are as follows:

5.14.1 SL-SCH Data Transmission
5.14.1.1 SL Grant Reception and SCI Transmission In order to transmit on the SL-SCH the MAC entity must have at least one sidelink grant.

Sidelink grants are selected as follows for V2X sidelink communication:

if the MAC entity is configured to receive a sidelink grant dynamically on the PDCCH and data is available in STCH, the MAC entity shall for each carrier configured in sl-V2X-ConfigDedicated for which a sidelink grant has been dynamically received on the PDCCH for this TTI:

use the received sidelink grant to determine the number of HARQ retransmissions and the set of subframes in which transmission of SCI and SL-SCH occur according to clauses 14.2.1 and 14.1.1.4A of TS 36.213 [2];

consider the received sidelink grant to be a configured sidelink grant for the carrier;

if the MAC entity is configured by upper layers to receive a sidelink grant on the PDCCH addressed to SL Semi-Persistent Scheduling V-RNTI, the MAC entity shall for each SL SPS configuration and for each carrier configured in sl-V2X-ConfigDedicated for which a sidelink grant has been received on the PDCCH addressed to SL Semi-Persistent Scheduling V-RNTI for this TTI:

if PDCCH contents indicate SPS activation:

use the received sidelink grant to determine the number of HARQ retransmissions and the set of subframes in which transmission of SCI and SL-SCH occur according to clauses 14.2.1 and 14.1.1.4A of TS 36.213 [2];

consider the received sidelink grant to be a configured sidelink grant for the carrier.

if PDCCH contents indicate SPS release:

clear the corresponding configured sidelink grant for the carrier.

if the MAC entity is configured by upper layers to transmit using pool(s) of resources in one or multiple carriers as indicated in clause 5.10.13.1 of TS 36.331 [8] based on sensing, or partial sensing, or random selection only if upper layers indicates that transmissions of multiple MAC PDUs are allowed according to clause 5.10.13.1a of TS 36.331 [8], and the MAC entity selects to create a configured sidelink grant corresponding to transmissions of multiple MAC PDUs, and data is available in STCH associated with one or multiple carriers, the MAC entity shall for each Sidelink process configured for multiple transmissions:

if there is no configured sidelink grant associated with the Sidelink process on any carrier allowed for the STCH as indicated by upper layers, as specified in TS 24.386 [15]:

trigger the TX carrier (re-)selection procedure as specified in clause 5.14.1.5;

else if there is a configured sidelink grant associated with the Sidelink process:

if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or if neither transmission nor retransmission has been performed by the MAC entity on any resource indicated in the configured sidelink grant during the last second; or if sl-ReselectAfter is configured and the number of consecutive unused transmission opportunities on resources indicated in the configured sidelink grant is equal to sl-ReselectAfter; or if none of the configured sidelink grant(s) on the carrier(s) allowed for the STCH have radio resources available in this TTI to accommodate a RLC SDU according to clause 5.14.1.3.1 by using the maximum allowed MCS configured by upper layers in maxMCS-PSSCH and the MAC entity selects not to segment the RLC SDU; or NOTE 4: If none of the configured sidelink grant(s) on the carrier(s) allowed for the STCH have radio resources available in this TTI to accommodate the RLC SDU according to clause 5.14.1.3.1, it is left for UE implementation whether to perform segmentation or sidelink resource reselection.

if none of the configured sidelink grant(s) on the carrier(s) allowed for the STCH have radio resources available in this TTI, according to clause 5.14.1.3.1 to fulfil the latency requirement of the data in a sidelink logical channel according to the associated PPPP, and the MAC entity selects not to perform transmission(s) corresponding to a single MAC PDU; or NOTE 5: If the latency requirement is not met, it is left for UE implementation whether to perform transmission(s) corresponding to single MAC PDU or sidelink resource reselection.

if the pool of resources where the sidelink grant is configured for the Sidelink process, is reconfigured by upper layers:

trigger the TX carrier (re-)selection procedure as specified in clause 5.14.1.5;

clear the configured sidelink grant associated to the Sidelink process;

flush the HARQ buffer associated to the Sidelink process;

else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:

clear the configured sidelink grant, if available;

randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

use the previously selected sidelink grant for the number of transmissions of the MAC PDUs determined in clause 14.1.1.4B of TS 36.213 [2] with the resource reservation interval to determine the set of subframes in which transmissions of SCI and SL-SCH occur according to clauses 14.2.1 and 14.1.1.4B of TS 36.213 [2];
consider the selected sidelink grant to be a configured sidelink grant;
if the TX carrier (re-)selection procedure was triggered in above and one or more carriers have been (re-)selected in the Tx carrier (re-)selection according to clause 5.14.1.5:
  determine the order of the (re-)selected carriers, according to the decreasing order based on the highest priority of logical channels which are allowed on each (re-)selected carrier, and perform the following for each Sidelink process on each (re-)selected carrier according to the order:
select one of the allowed values configured by upper layers in restrictResourceReservationPeriod and set the resource reservation interval by multiplying 100 with the selected value;
NOTE 6: How the UE selects this value is up to UE implementation.
randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to TS 36.214 [6] if CBR measurement results are available or the corresponding defaultTxConfigIndex configured by upper layers if CBR measurement results are not available;
select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to TS 36.214 [6] if CBR measurement results are available or the corresponding defaultTxConfigIndex configured by upper layers if CBR measurement results are not available;
randomly select the time and frequency resources for one transmission opportunity from the resources indicated by the physical layer according to clause 14.1.1.6 of TS 36.213 [2], according to the amount of selected frequency resources. The selected time and frequency resources shall fulfil the physical layer requirements as specified in TS 36.101 [10], and the random function shall be such that each of the allowed selections can be chosen with equal probability;
use the randomly selected resource to select a set of periodic resources spaced by the resource reservation interval for transmission opportunities of SCI and SL-SCH corresponding to the number of transmission opportunities of MAC PDUs determined in clause 14.1.1.4B of TS 36.213 [2];
if the number of HARQ retransmissions is equal to 1:
  if there are available resources left in the resources indicated by the physical layer according to clause 14.1.1.6 of TS 36.213 [2] that meet the conditions in clause 14.1.1.7 of TS 36.213 [2] for more transmission opportunities:
    randomly select the time and frequency resources for one transmission opportunity from the available resources, according to the amount of selected frequency resources. The selected time and frequency resources shall fulfil the physical layer requirements as specified in TS 36.101 [10], and the random function shall be such that each of the allowed selections can be chosen with equal probability;
    use the randomly selected resource to select a set of periodic resources spaced by the resource reservation interval for the other transmission opportunities of SCI and SL-SCH corresponding to the number of retransmission opportunities of the MAC PDUs determined in clause 14.1.1.4B of TS 36.213 [2];
    consider the first set of transmission opportunities as the new transmission opportunities and the other set of transmission opportunities as the retransmission opportunities;
    consider the set of new transmission opportunities and retransmission opportunities as the selected sidelink grant.
  else:
    consider the set as the selected sidelink grant;
use the selected sidelink grant to determine the set of subframes in which transmissions of SCI and SL-SCH occur according to clause 14.2.1 and 14.1.1.4B of TS 36.213 [2];
consider the selected sidelink grant to be a configured sidelink grant;
else, if the MAC entity is configured by upper layers to transmit using pool(s) of resources in one or multiple carriers as indicated in clause 5.10.13.1 of TS 36.331 [8], the MAC entity selects to create a configured sidelink grant corresponding to transmission(s) of a single MAC PDU, and data is available in STCH associated with one or multiple carriers, the MAC entity shall for a Sidelink process:
trigger the TX carrier (re-)selection procedure as specified in clause 5.14.1.5;
if one or more carriers have been (re-)selected in the Tx carrier (re-)selection according to clause 5.14.1.5:
  determine the order of the (re-)selected carriers, according to the decreasing order based on the highest priority of logical channels which are allowed on each (re-)selected carrier, and perform the following for each Sidelink process on each (re-)selected carrier according to the order:
select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to TS 36.214 [6] if CBR measurement results are available or the corresponding defaultTxConfigIndex configured by upper layers if CBR measurement results are not available;

select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to TS 36.214 [6] if CBR measurement results are available or the corresponding defaultTxConfigIndex configured by upper layers if CBR measurement results are not available;

randomly select the time and frequency resources for one transmission opportunity of SCI and SL-SCH from the resources indicated by the physical layer according to clause 14.1.1.6 of TS 36.213 [2], according to the amount of selected frequency resources. The selected time and frequency resources shall fulfil the physical layer requirement as specified in TS 36.101 [10], and the random function shall be such that each of the allowed selections can be chosen with equal probability;

if the number of HARQ retransmissions is equal to 1:
  if there are available resources left in the resources indicated by the physical layer according to clause 14.1.1.6 of TS 36.213 [2] that meet the conditions in subclause 14.1.1.7 of TS 36.213 [2] for one more transmission opportunity:
    randomly select the time and frequency resources for the other transmission opportunity of SCI and SL-SCH corresponding to additional transmission of the MAC PDU from the available resources, according to the amount of selected frequency resources. The selected time and frequency resources shall fulfil the physical layer requirements as specified in TS 36.101 [10], and the random function shall be such that each of the allowed selections can be chosen with equal probability;
    consider a transmission opportunity which comes first in time as the new transmission opportunity and a transmission opportunity which comes later in time as the retransmission opportunity;
    consider both of the transmission opportunities as the selected sidelink grant;
  else:
    consider the transmission opportunity as the selected sidelink grant;
  use the selected sidelink grant to determine the subframes in which transmission(s) of SCI and SL-SCH occur according to clause 14.2.1 and 14.1.1.4B of TS 36.213 [2];

consider the selected sidelink grant to be a configured sidelink grant.

NOTE 7: For V2X sidelink communication, the UE should ensure the randomly selected time and frequency resources fulfill the latency requirement.

NOTE 8: For V2X sidelink communication, when there is no overlapping between the chosen configuration(s) in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.

The MAC entity shall for each subframe:
for each configured sidelink grant occurring in this subframe:
  if SL_RESOURCE_RESELECTION_COUNTER=1 for the Sidelink process associated with the configured sidelink grant and the MAC entity randomly selected, with equal probability, a value in the interval [0, 1] which is above the probability configured by upper layers in probResourceKeep:
    set the resource reservation interval for the configured sidelink grant equal to 0;
  if the configured sidelink grant corresponds to transmission of SCI:
    for V2X sidelink communication in UE autonomous resource selection:
      consider the selected transmission format to be SL-V2X-TxProfile for the highest priority of the sidelink logical channel(s) in the MAC PDU (TS 36.331 [8]);
      select a MCS which is, if configured, within the range that is configured by upper layers between minMCS-PSSCH and maxMCS-PSSCH included in pssch-TxConfigList associated with the selected transmission format and, if configured by upper layers, overlapped between minMCS-PSSCH and maxMCS-PSSCH indicated in cbr-pssch-TxConfigList associated with the selected transmission format for the highest priority of the sidelink logical channel(s) in the MAC PDU and the CBR measured by lower layers according to TS 36.214 [6] if CBR measurement results are available or the corresponding defaultTxConfigIndex configured by upper layers if CBR measurement results are not available;
      NOTE 9: MCS selection is up to UE implementation if the MCS or the corresponding range is not configured by upper layers.
      NOTE 10: For V2X sidelink communication, when there is no overlapping between the chosen configuration(s) included in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.
    for V2X sidelink communication in scheduled resource allocation:

consider the selected transmission format to be SL-V2X-TxProfile for the highest priority of the sidelink logical channel(s) in the MAC PDU (TS 36.331 [8]);

select a MCS which is associated with the selected transmission format unless it is configured by upper layer;

instruct the physical layer to transmit SCI corresponding to the configured sidelink grant;

for V2X sidelink communication, deliver the configured sidelink grant, the associated HARQ information and the value of the highest priority of the sidelink logical channel(s) in the MAC PDU to the Sidelink HARQ Entity for this subframe;

else if the configured sidelink grant corresponds to transmission of first transport block for sidelink communication:

deliver the configured sidelink grant and the associated HARQ information to the Sidelink HARQ Entity for this subframe.

NOTE 11: If the MAC entity has multiple configured sidelink grants occurring in one subframe and if not all of them can be processed due to the single-cluster SC-FDM restriction, it is left for UE implementation which one of these to process according to the procedure above.

5.14.1.2 Sidelink HARQ Operation 5.14.1.2.1 Sidelink HARQ Entity

The MAC entity is configured by upper layers to transmit using pool(s) of resources on one or multiple carriers as indicated in clause 5.10.13.1 of TS 36.331 [8]. For each carrier, there is one Sidelink HARQ Entity at the MAC entity for transmission on SL-SCH, which maintains a number of parallel Sidelink processes.

For sidelink communication, the number of transmitting Sidelink processes associated with the Sidelink HARQ Entity is defined in TS 36.331 [8].

For V2X sidelink communication, the maximum number of transmitting Sidelink processes associated with each Sidelink HARQ Entity is 8. A sidelink process may be configured for transmissions of multiple MAC PDUs. For transmissions of multiple MAC PDUs, the maximum number of transmitting Sidelink processes associated with each Sidelink HARQ Entity is 2.

A delivered and configured sidelink grant and its associated HARQ information are associated with a Sidelink process.

For each subframe of the SL-SCH and each Sidelink process, the Sidelink HARQ Entity shall:

if a sidelink grant corresponding to a new transmission opportunity has been indicated for this Sidelink process and there is SL data, for sidelink logical channels of ProSe destination associated with this sidelink grant, available for transmission:

obtain the MAC PDU from the "Multiplexing and assembly" entity;

deliver the MAC PDU and the sidelink grant and the HARQ information to this Sidelink process;

instruct this Sidelink process to trigger a new transmission.

else, if this subframe corresponds to retransmission opportunity for this Sidelink process:

instruct this Sidelink process to trigger a retransmission.

NOTE: The resources for retransmission opportunities are specified in clause 14.2.1 of TS 36.213 [2] unless specified in clause 5.14.1.1.

5.14.1.2.2 Sidelink Process

The Sidelink process is associated with a HARQ buffer.

The sequence of redundancy versions is 0, 2, 3, 1. The variable CURRENT_IRV is an index into the sequence of redundancy versions. This variable is updated modulo 4.

New transmissions and retransmissions either for a given SC period in sidelink communication or in V2X sidelink communication are performed on the resource indicated in the sidelink grant as specified in clause 5.14.1.1 and with the MCS selected as specified in clause 5.14.1.1.

If the sidelink process is configured to perform transmissions of multiple MAC PDUs for V2X sidelink communication the process maintains a counter SL_RESOURCE_RESELECTION_COUNTER. For other configurations of the sidelink process, this counter is not available.

If the Sidelink HARQ Entity requests a new transmission, the Sidelink process shall:

set CURRENT_IRV to 0;

store the MAC PDU in the associated HARQ buffer;

store the sidelink grant received from the Sidelink HARQ Entity;

generate a transmission as described below.

If the Sidelink HARQ Entity requests a retransmission, the Sidelink process shall:

generate a transmission as described below.

To generate a transmission, the Sidelink process shall:

if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and if there is no Sidelink Discovery Gap for Transmission or no transmission on PSDCH at the time of the transmission; or, in case of transmissions of V2X sidelink communication, if the MAC entity is able to perform transmissions on SL-SCH and transmissions on PSDCH simultaneously at the time of the transmission:

instruct the physical layer to generate a transmission according to the stored sidelink grant with the redundancy version corresponding to the CURRENT_IRV value.

increment CURRENT_IRV by 1;

if this transmission corresponds to the last transmission of the MAC PDU:

decrement SL_RESOURCE_RESELECTION_COUNTER by 1, if available.

The transmission of the MAC PDU for V2X sidelink communication is prioritized over uplink transmissions if the following conditions are met:

if the MAC entity is not able to perform all uplink transmissions and all transmissions of V2X sidelink communication simultaneously at the time of the transmission; and if uplink transmission is not prioritized by upper layer according to TS 24.386 [15]; and if the value of the highest priority of the sidelink logical channel(s) in the MAC PDU is lower than thresSL-TxPrioritization if thresSL-TxPrioritization is configured.

5.14.2 SL-SCH Data Reception 5.14.2.1 SCI Reception

SCI transmitted on the PSCCH indicate if there is a transmission on SL-SCH and provide the relevant HARQ information.

The MAC entity shall:
for each subframe during which the MAC entity monitors PSCCH:
  if SCI for this subframe has been received on the PSCCH for sidelink communication with a Group Destination ID of interest to this MAC entity:
    determine the set of subframes in which reception of the first transport blocks occur according to clause 14.2.2 of TS 36.213 [2] using the received SCI;
    store the SCI and associated HARQ information as SCI valid for the subframes corresponding to first transmission of each transport block;
  else if SCI for this subframe has been received on the PSCCH for V2X sidelink communication:
    determine the set of subframes in which reception of the transport block occur according to clause 14.1.2 of TS 36.213 [2] using the received SCI;
    store the SCI and associated HARQ information as SCI valid for the subframes corresponding to transmission(s) of the transport block;
for each subframe for which the MAC entity has a valid SCI:
  deliver the SCI and the associated HARQ information to the Sidelink HARQ Entity.

5.14.2.2 Sidelink HARQ Operation 5.14.2.2.1 Sidelink HARQ Entity

For each carrier, there is one Sidelink HARQ Entity at the MAC entity for reception of the SL-SCH, which maintains a number of parallel Sidelink processes.

Each Sidelink process is associated with SCI in which the MAC entity is interested. If SCI includes the Group Destination ID, this interest is as determined by the Group Destination ID of the SCI. The Sidelink HARQ Entity directs HARQ information and associated TBs received on the SL-SCH to the corresponding Sidelink processes.

The number of Receiving Sidelink processes associated with the Sidelink HARQ Entity is defined in TS 36.331 [8].

For each subframe of the SL-SCH, the Sidelink HARQ Entity shall:
for each SCI valid in this subframe:
  allocate the TB received from the physical layer and the associated HARQ information to a Sidelink process, associate this Sidelink process with this SCI and consider this transmission to be a new transmission.
for each Sidelink process:
  if this subframe corresponds to retransmission opportunity for the Sidelink process according to its associated SCI:
    allocate the TB received from the physical layer and the associated HARQ information to the Sidelink process and consider this transmission to be a retransmission.

5.14.2.2.2 Sidelink Process

For each subframe where a transmission takes place for the Sidelink process, one TB and the associated HARQ information is received from the Sidelink HARQ Entity.

The sequence of redundancy versions is 0, 2, 3, 1. The variable CURRENT_IRV is an index into the sequence of redundancy versions. This variable is updated modulo 4.

For each received TB and associated HARQ information, the Sidelink process shall:
if this is a new transmission:
  set CURRENT_IRV to 0;
  store the received data in the soft buffer and optionally attempt to decode the received data according to CURRENT_IRV.
else if this is a retransmission:
  if the data for this TB has not yet been successfully decoded:
    increment CURRENT_IRV by 1;
    combine the received data with the data currently in the soft buffer for this TB and optionally attempt to decode the combined data according to the CURRENT_IRV.
if the data which the MAC entity attempted to decode was successfully decoded for this TB:
  if this is the first successful decoding of the data for this TB:
    if the DST field of the decoded MAC PDU subheader is equal to the 16 MSB of any of the Destination Layer-2 ID(s) of the UE for which the 8 LSB are equal to the Group Destination ID in the corresponding SCI:
      deliver the decoded MAC PDU to the disassembly and demultiplexing entity.
    else if the DST field of the decoded MAC PDU subheader is equal to any of the Destination Layer-2 ID(s) of the UE:
      deliver the decoded MAC PDU to the disassembly and demultiplexing entity.

In 3GPP RAN1 #96bis meeting (as captured in the 3GPP RAN1 #96bis meeting report), it is agreed that no new reference signal dedicated to SL (Sidelink) RLM (Radio Link Monitoring) is introduced, and no RS (Reference Signal) transmission in a periodic manner only for SL RLM purposes as follows:

Agreements:
  No new reference signal dedicated to SL RLM is introduced.
    Existing SL RS is reused for SL RLM/RLF
      Note: CSI-RS is not precluded
    RAN1 has no intention to introduce RS transmitted in a periodic manner only for SL RLM purposes
    FFS:
      Whether SL RS is transmitted in a stand-alone manner for SL RLM/RLF Agreements:
  Regarding metric for SL RLM/RLF declaration, RAN1 discussed the following (to be further studied):
    Reuse IS/OOS metric in Uu RLM as much as possible but considering the condition that RAN1 has no intention to introduce RS transmitted in a periodic manner only for SL RLM purposes
    Other metrics, e.g., congestion control metric (similar to CBR in LTE), consecutive HARQ-NACKs, etc.
    Note: RAN1 expects further input from RAN2 to further progress on this topic In the 3GPP RAN2 #106 meeting (as captured in the 3GPP RAN2 #106 meeting report), an assumption is agreed that for PC5 RLM/RLF, physical layer provides periodic indications of IS/OOS to the upper layer as follows:

---

Agreements on PC5 RLM/RLF:

1: Even though transmission of sidelink signal occur irregularly, RAN2 assumes that the physical layer provides periodic indications of IS/OOS to the upper layer as in Uu RLM.
2: From RAN2 perspective, both side UEs perform RLM/RLF detection mechanism. FFS on whether periodic indications of IS/OOS based RLM/RLF is reused or any additional new mechanism is needed.

---

In the 3GPP RAN1 #94 chairman's note (as captured in the 3GPP RAN1 #94 meeting report), the agreements of NR V2X are provided as follows:

Agreements:
At least two sidelink resource allocation modes are defined for NR-V2X sidelink communication
  Mode 1: Base station schedules sidelink resource(s) to be used by UE for sidelink transmission(s)
  Mode 2: UE determines (i.e. base station does not schedule) sidelink transmission resource(s) within sidelink resources configured by base station/network or pre-configured sidelink resources In the 3GPP RAN1 #AH1901 meeting (as captured in the 3GPP RAN1 #AH1901 meeting report), agreements have been made regarding SCI format as follows:

Agreements:
  Layer-1 destination ID can be explicitly included in SCI
    FFS how to determine Layer-1 destination ID
    FFS size of Layer-1 destination ID
  The following additional information can be included in SCI
    Layer-1 source ID
      FFS how to determine Layer-1 source ID
      FFS size of Layer-1 source ID
    HARQ process ID
    New Data Indicator (NDI)
    Redundancy Version (RV)
    FFS whether some of the above information may not be present etc. in some operations (e.g., depending on whether they are used for unicast, groupcast, broadcast)

3GPP TS 36.331 introduces V2X sidelink transmission and resource pool selection as follows:

5.10.13 V2X Sidelink Communication Transmission
5.10.13.1 Transmission of V2X Sidelink Communication A UE capable of V2X sidelink communication that is configured by upper layers to transmit V2X sidelink communication and has related data to be transmitted shall:
1> if the conditions for sidelink operation as defined in 5.10.1d are met:
  2> if in coverage on the frequency used for V2X sidelink communication as defined in TS 36.304 [4], clause 11.4; or
  2> if the frequency used to transmit V2X sidelink communication is included in v2x-InterFreqInfoList in RRCConnectionReconfiguration or in v2x-InterFreqInfoList within SystemInformationBlockType21 or SystemInformationBlockType26:
    3> if the UE is in RRC_CONNECTED and uses the PCell or the frequency included in v2x-InterFreqInfoList in RRCConnectionReconfiguration for V2X sidelink communication:
      4> if the UE is configured, by the current PCell with commTxResources set to scheduled:
        5> if T310 or T311 is running; and if the PCell at which the UE detected physical layer problems or radio link failure broadcasts SystemInformationBlockType21 including v2x-CommTxPoolExceptional in sl-V2X-ConfigCommon, or v2x-CommTxPoolExceptional is included in v2x-InterFreqInfoList for the concerned frequency in SystemInformationBlockType21 or SystemInformationBlockType26 or RRCConnectionReconfiguration; or
        5> if T301 is running and the cell on which the UE initiated connection re-establishment broadcasts SystemInformationBlockType21 including v2x-CommTxPoolExceptional in sl-V2X-ConfigCommon, or v2x-CommTxPoolExceptional is included in v2x-InterFreqInfoList for the concerned frequency in SystemInformationBlockType21 or SystemInformationBlockType26; or
        5> if T304 is running and the UE is configured with v2x-CommTxPoolExceptional included in mobilityControlInfoV2X in RRCConnectionReconfiguration or in v2x-InterFreqInfoList for the concerned frequency in RRCConnectionReconfiguration:
          6> configure lower layers to transmit the sidelink control information and the corresponding data based on random selection using the pool of resources indicated by v2x-CommTxPoolExceptional as defined in TS 36.321 [6];
        5> else:
          6> configure lower layers to request E-UTRAN to assign transmission resources for V2X sidelink communication;
      4> else if the UE is configured with v2x-CommTxPoolNormalDedicated or v2x-CommTxPoolNormal or p2x-CommTxPoolNormal in the entry of v2x-InterFreqInfoList for the concerned frequency in sl-V2X-ConfigDedicated in RRCConnectionReconfiguration:
        5> if the UE is configured to transmit non-P2X related V2X sidelink communication and a result of sensing on the resources configured in v2x-CommTxPoolNormalDedicated or v2x-CommTxPoolNormal in the entry of v2x-InterFreqInfoList for the concerned frequency in RRCConnectionReconfiguration is not available in accordance with TS 36.213 [23]; or
        5> if the UE is configured to transmit P2X related V2X sidelink communication and selects to use partial sensing according to 5.10.13.1a, and a result of partial sensing on the resources configured in v2x-CommTxPoolNormalDedicated or p2x-CommTxPoolNormal in the entry of v2x-InterFreqInfoList for the concerned frequency in RRCConnectionReconfiguration is not available in accordance with TS 36.213 [23]:
          6> if v2x-CommTxPoolExceptional is included in mobilityControlInfoV2X in RRCConnectionReconfiguration (i.e., handover case); or
          6> if v2x-CommTxPoolExceptional is included in the entry of v2x-InterFreqInfoList for the concerned frequency in RRCConnectionReconfiguration; or
          6> if the PCell broadcasts SystemInformationBlockType21 including v2x-CommTxPoolExceptional in sl-V2X-ConfigCommon or v2x-CommTxPoolExceptional in v2x-InterFreqInfoList for the concerned frequency or broadcasts SystemInformationBlockType26 including v2x-CommTxPoolExceptional in v2x-InterFreqInfoList for the concerned frequency:
            7> configure lower layers to transmit the sidelink control information and the corresponding data based on random selection using the pool of resources indicated by v2x-CommTxPoolExceptional as defined in TS 36.321 [6];
        5> else if the UE is configured to transmit P2X related V2X sidelink communication:
          6> select a resource pool according to 5.10.13.2;

6> perform P2X related V2X sidelink communication according to 5.10.13.1a;
5> else if the UE is configured to transmit non-P2X related V2X sidelink communication:
6> configure lower layers to transmit the sidelink control information and the corresponding data based on sensing (as defined in TS 36.321 [6] and TS 36.213 [23]) using one of the resource pools indicated by v2x-commTxPool-NormalDedicated or v2x-CommTxPoolNormal in the entry of v2x-InterFreqInfoList for the concerned frequency, which is selected according to 5.10.13.2;
3> else:
4> if the cell chosen for V2X sidelink communication transmission broadcasts SystemInformationBlockType21 or SystemInformationBlockType26:
5> if the UE is configured to transmit non-P2X related V2X sidelink communication, and if SystemInformationBlockType21 includes v2x-CommTxPoolNormalCommon or v2x-CommTxPoolNormal in v2x-InterFreqInfoList for the concerned frequency, or SystemInformationBlockType26 includes v2x-CommTxPoolNormal in v2x-InterFreqInfoList for the concerned frequency, and if a result of sensing on the resources configured in v2x-CommTxPoolNormalCommon or v2x-CommTxPoolNormal in v2x-InterFreqInfoList for the concerned frequency is available in accordance with TS 36.213 [23]:
6> configure lower layers to transmit the sidelink control information and the corresponding data based on sensing (as defined in TS 36.321 [6] and TS 36.213 [23]) using one of the resource pools indicated by v2x-CommTxPoolNormalCommon or v2x-CommTxPoolNormal in v2x-InterFreqInfoList for the concerned frequency, which is selected according to 5.10.13.2;
5> else if the UE is configured to transmit P2X related V2X sidelink communication, and if SystemInformationBlockType21 includes p2x-CommTxPoolNormalCommon or p2x-CommTxPoolNormal in v2x-InterFreqInfoList for the concerned frequency, or SystemInformationBlockType26 includes p2x-CommTxPoolNormal in v2x-InterFreqInfoList for the concerned frequency, and if the UE selects to use random selection according to 5.10.13.1a, or selects to use partial sensing according to 5.10.13.1a and a result of partial sensing on the resources configured in p2x-CommTxPoolNormalCommon or p2x-CommTxPoolNormal in v2x-InterFreqInfoList for the concerned frequency is available in accordance with TS 36.213 [23]:
6> select a resource pool from p2x-CommTxPoolNormalCommon or p2x-CommTxPoolNormal in v2x-InterFreqInfoList for the concerned frequency according to 5.10.13.2, but ignoring zoneConfig in SystemInformationBlockType21 or SystemInformationBlockType26;
6> perform P2X related V2X sidelink communication according to 5.10.13.1a;

5> else if SystemInformationBlockType21 includes v2x-CommTxPoolExceptional in sl-V2X-ConfigCommon or v2x-CommTxPoolExceptional in v2x-InterFreqInfoList for the concerned frequency, or SystemInformationBlockType26 includes v2x-CommTxPoolExceptional in v2x-InterFreqInfoList for the concerned frequency:
6> from the moment the UE initiates connection establishment until receiving an RRCConnectionReconfiguration including sl-V2X-ConfigDedicated, or until receiving an RRCConnectionRelease or an RRCConnectionReject; or
6> if the UE is in RRC_IDLE and a result of sensing on the resources configured in v2x-CommTxPoolNormalCommon or v2x-CommTxPoolNormal in v2x-InterFreqInfoList for the concerned frequency in Systeminformationblocktype21 or v2x-CommTxPoolNormal in v2x-InterFreqInfoList for the concerned frequency in Systeminformationblocktype26 is not available in accordance with TS 36.213 [23]; or
6> if the UE is in RRC_IDLE and UE selects to use partial sensing according to 5.10.13.1a and a result of partial sensing on the resources configured in p2x-CommTxPoolNormalCommon or p2x-CommTxPoolNormal in v2x-InterFreqInfoList for the concerned frequency in Systeminformationblocktype21 or v2x-CommTxPoolNormal in v2x-InterFreqInfoList for the concerned frequency in Systeminformationblocktype26 is not available in accordance with TS 36.213 [23]:
7> configure lower layers to transmit the sidelink control information and the corresponding data based on random selection (as defined in TS 36.321 [6]) using the pool of resources indicated in v2x-CommTxPoolExceptional;
2> else:
3> configure lower layers to transmit the sidelink control information and the corresponding data based on sensing (as defined in TS 36.321 [6] and TS 36.213 [23]) using one of the resource pools indicated by v2x-CommTxPoolList in SL-V2X-Preconfiguration in case of non-P2X related V2X sidelink communication, which is selected according to 5.10.13.2, or using one of the resource pools indicated by p2x-CommTxPoolList in SL-V2X-Preconfiguration in case of P2X related V2X sidelink communication, which is selected according to 5.10.13.2, and in accordance with the timing of the selected reference as defined in 5.10.8;

The UE capable of non-P2X related V2X sidelink communication that is configured by upper layers to transmit V2X sidelink communication shall perform sensing on all pools of resources which may be used for transmission of the sidelink control information and the corresponding data. The pools of resources are indicated by SL-V2X-Preconfiguration, v2x-CommTxPoolNormalCommon, v2x-CommTxPoolNormalDedicated in sl-V2X-ConfigDedicated, or v2x-CommTxPoolNormal in v2x-InterFreqInfoList for the concerned frequency, as configured above.

NOTE 1: If there are multiple frequencies for which normal or exceptional pools are configured, it is up to UE implementation which frequency is selected for V2X sidelink communication transmission.

In 3GPP TS 38.321, MAC (Medium Access Control) reset is introduced as follows:

5.12 MAC Reset

If a reset of the MAC entity is requested by upper layers, the MAC entity shall:
1> initialize Bj for each logical channel to zero;
1> stop (if running) all timers;
1> consider all timeAlignmentTimers as expired and perform the corresponding actions in clause 5.2;
1> set the NDIs for all uplink HARQ processes to the value 0;
1> stop, if any, ongoing RACH procedure;
1> discard explicitly signalled contention-free Random Access Resources, if any;
1> flush Msg3 buffer;
1> cancel, if any, triggered Scheduling Request procedure;
1> cancel, if any, triggered Buffer Status Reporting procedure;
1> cancel, if any, triggered Power Headroom Reporting procedure;
1> flush the soft buffers for all DL HARQ processes;
1> for each DL HARQ process, consider the next received transmission for a TB as the very first transmission;
1> release, if any, Temporary C-RNTI;
1> reset BFI_COUNTER.

In a document (3GPP R1-1900885) in RAN1 #AH1901 meeting, it was introduced that layer-1 source ID could be derived from layer-2 source ID provided by upper layers as follows:

3. HARQ Combining and L1 IDs

As part of the SA2 study, groupcast communication in NR-V2X was discussed and agreements were made regarding the availability of IDs in L2. The relevant agreements are shown below:

---

This solution follows the below principles when NR PC5 is the selected RAT:

V2X Layer informs the Access Stratum (AS) Layer of the Destination L2 ID and Source L2 ID for the group communication transmission, based on group identifier provided by Application Layer;
V2X Layer informs the Access Stratum Layer of the communication type, and QoS parameters (including 5QI and Range) for the group communication traffic;
V2X Layer informs the Access Stratum Layer of the Destination L2 ID for the group communication reception;
When V2X Layer receives no group information from Application Layer, it should use then use the configured mapping, e.g. derive destination L2 ID and QoS parameters (e.g. 5QI and Range) based on PSID/ITS-AID mapping, and use that for the operation;
V2X Layer coverts the Group Identifier provided by Application Layer into the Destination L2 ID, using a mechanism defined by stage 3.

---

From the agreements made, it's clear that for unicast and groupcast communications, the destination and source L2 IDs are provided to the Tx UE. RAN1 has already agreed that L1 destination IDs are indicated through the PSCCH channel. Therefore, it is straightforward to derive the L1 destination IDs from the L2 IDs by selecting a fixed number of LSBs of the L2 IDs similar to the procedure defined in R12/13.

Proposal 7: Layer-1 destination ID is derived from L2 destination ID by selecting a fixed number of LSBs As described above, SA2 has determined that the L2 Source ID would also be indicated to the access layer. Therefore, it is straightforward to derive the L1 Source ID from the L2 Source ID by select a fixed number of LBSs of the Source ID. The mechanism by which the Layer-1 destination ID and the source ID are encoded together is FFS.

Proposal 9: Layer-1 Source ID is included as part of PSCCH to enable HARQ combining. Layer-1 Source ID is derived from the L2 Source ID by selecting a fixed number of LSBs In 3GPP RAN2 #103bis meeting (as captured in the 3GPP RAN2 #103bis meeting report), it is agreed that unicast, groupcast and broadcast will be supported in NR V2X as follows:

---

Agreements

1: Unicast, groupcast, and broadcast should be supported for all of the in-coverage, out-of-coverage, and partial coverage scenarios.

---

In 3GPP RAN2 #106 meeting (as captured the 3GPP RAN2 #106 meeting report), SL RLM (Radio Link Monitoring) based on SCI (Sidelink Control Information) is introduced by LG (as discussed in 3GPP R2-1907658) as follows:

According to last RAN1 decision, there is no RS for SL RLM. That is, RX UE must precede the SCI decoding in order to measure the signal of specific TX UE. However, when SCI is decoded, it means that channel status is not bad. Moreover, if the channel status is bad, SCI decoding itself does not work.

Therefore, in case of no RLM dedicated RS, it is necessary to consider enabling the RX UE to perform PC5 RLM well. There is also a need for a new metric to replace the sidelink quality measurement via RS.

Observation 1. Since RAN1 agreed not to define a new RS periodically transmitted for PC5 RLM, IS/OOS determination at RX UE cannot straightforwardly reuse the principle of Uu.

Observation 2. According to the RAN1 Reply LS, RX UE must precede the SCI decoding in order to measure the signal of specific TX UE. However, when SCI is decoded, it means that channel status is not bad. Moreover, if the channel status is bad, SCI decoding itself does not work.

Observation 3. A unicast connection can be assumed to be IS if the corresponding SCI is successfully delivered within a certain time duration.

Proposal 1. Even though transmission of sidelink signal occur irregularly, RAN2 assumes that the physical layer provides periodic indications of IS/OOS to the upper layer as in Uu RLM.

Proposal 2. RAN2 assumes that the criteria of IS/OOS can be based on the number of successful SCI reception within the period. Details of IS/OOS criteria and necessary physical layer design are to be defined in RAN1.

In RAN1 #97 meeting (as captured in 3GPP R1-1907755), content of SCI for different cast types is discussed as follows:

Proposal

The following SCI contents are supported.

| Bit field | candidate size | unicast | groupcast | broadcast |
|---|---|---|---|---|
| HARQ process number | [1-4] | ○ | ○ | FFS |
| NDI | 1 | ○ | ○ | FFS |
| RV | 2 | ○ | ○ | FFS |
| Layer-1 source ID | [8-24] | ○ | ○ | FFS |
| Layer-1 destination ID | [8-24] | ○ | ○ | FFS |
| MCS | [5] | ○ | ○ | ○ |

| Bit field | candidate size | unicast | groupcast | broadcast |
|---|---|---|---|---|
| CRC | 24 | O | O | O |
| QoS indication | 3 | O | O | O |
| CSI request | [1] | O | X | X |
| DMRS pattern | [1-2] | O | O | FFS |

One or multiple of following terminologies may be used hereafter:
 BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
 TRP: A transmission and reception point provides network coverage and directly communicates with UEs. TRP could also be referred to as distributed unit (DU) or network node.
 Cell: A cell is composed of one or multiple associated TRPs, i.e. coverage of the cell is composed of coverage of all associated TRP(s). One cell is controlled by one BS. Cell could also be referred to as TRP group (TRPG).
 Slot: A slot could be a scheduling unit in NR. A slot duration has 14 OFDM symbols.
 Mini-slot: A mini-slot is a scheduling unit with duration less than 14 OFDM symbols.

One or multiple of following assumptions for network side may be used hereafter:
 Downlink timing of TRPs in the same cell are synchronized.
 RRC layer of network side is in BS.

One or multiple of following assumptions for UE side may be used hereafter:
 There are at least two UE (RRC) states: connected state (or called active state) and non-connected state (or called inactive state or idle state). Inactive state may be an additional state or belong to connected state or non-connected state.

In 3GPP RAN2 #103bis meeting, it is agreed that unicast, broadcast, and groupcast will be supported in NR V2X. According to the RAN1 #97 discussion, SCI for sidelink unicast or groupcast could contain HARQ process number for HARQ combining. However, since a V2X UE could be performing sidelink unicast or groupcast with more than one UE, it is possible that two UE could indicate a same HARQ process number to the V2X UE, and a collision could occur. Furthermore, since sidelink broadcast may not require HARQ combining, and content of SCI could be different from SCI for unicast or groupcast (e.g. no HARQ process number), the V2X UE could have different behavior regarding reception of SCI/SL data of different cast types. In this application, possible architecture and behaviors for a V2X UE performing sidelink communication are discussed.

First Concept

In a first concept, a first UE could maintain one (sidelink) MAC entity for all sidelink unicast transmission associated with one or more second UEs (e.g. associated with one or more Layer-2 Destination ID). The first UE could maintain one HARQ (Hybrid Automatic Repeat Request) entity associated with (all) sidelink broadcast receptions. The one HARQ entity associated with (all) sidelink broadcast receptions could maintain a number of (parallel) sidelink HARQ processes. Each sidelink HARQ process maintained by the one HARQ entity associated with (all) sidelink broadcast receptions could be associated with SCI in which the first UE is interested. The first UE could determine whether the first UE is interested in the SCI at least based on Destination ID associated with the SCI (e.g., Layer-1 Destination ID indicated by the SCI). Additionally or alternatively, the first UE could determine whether the first UE is interested in the SCI at least based on whether the SCI is for sidelink broadcast (e.g. the first UE is interested in the SCI if the SCI is for sidelink broadcast). The first UE could associate HARQ information and TBs (Transport Blocks) associated with the SCI to a sidelink HARQ process. The first UE could associate different SCIs to different HARQ processes (in the one HARQ entity associated with sidelink broadcast) if the different SCIs are associated with different TBs. Additionally or alternatively, the first UE could associate different SCIs to different HARQ processes (in the one HARQ entity associated with sidelink broadcast).

Additionally or alternatively, the first UE could maintain one HARQ entity for each sidelink groupcast reception. The first UE could associate each of the one HARQ entity for each sidelink groupcast reception with (Group) (Layer-1/Layer-2) Destination ID (the first UE is interested in). Additionally or alternatively, the first UE could associate each of the one HARQ entity for each sidelink groupcast reception with (Group) (Layer-1/Layer-2) Source ID. The Source ID and/or Destination ID could be indicated by SCI received by the first UE. The first UE could associate the SCI with one of the HARQ entity for sidelink groupcast reception. In other words, the first UE would derive the one of the HARQ entity for sidelink groupcast reception based on a pair of (Layer-1/Layer-2) Destination ID and (Layer-1/Layer-2) Source ID. The first UE could associate TBs and HARQ information associated with the SCI with a HARQ process of the HARQ entity. The HARQ information/SCI could indicate HARQ process number, wherein the first UE associate the SCI with a HARQ process associated with the HARQ process number.

Additionally or alternatively, the first UE could maintain one HARQ entity for each sidelink unicast reception. Additionally or alternatively, the first UE could maintain one HARQ entity for each pair of destination ID and source ID. The first UE could associate each of the one HARQ entity for each sidelink unicast reception with one or more (Group) (Layer-1/Layer-2) Destination ID (which the first UE is interested in). Additionally or alternatively, the first UE could associate each of the one HARQ entity for each sidelink unicast reception with one or more (Group) (Layer-1/Layer-2) Source ID. The one or more Source ID and/or Destination ID could be indicated by SCI received by the first UE. Additionally or alternatively, the first UE could associate each of the one HARQ entity for each sidelink unicast reception or sidelink unicast link with a second UE. The first UE could associate the SCI with one of the HARQ entity for sidelink unicast reception or sidelink unicast link. The first UE could associate TBs and HARQ information associated with the SCI with a HARQ process of the HARQ entity. The HARQ information or SCI could indicate HARQ process number, wherein the first UE associate the SCI with a HARQ process associated with the HARQ process number.

An illustration of the first concept is shown in FIG. 6. FIG. 6 illustrates an example where a UE maintains one MAC entity with multiple HARQ entities for different cast types. A first UE could be configured to perform sidelink broadcast communication. (e.g. receives sidelink broadcast from one or more UEs). The first UE could maintain a HARQ entity (dedicated) for handling sidelink broadcast reception (in a MAC entity). When receiving a SCI indicating sidelink broadcast, the first UE could associate the SCI (and TB and HARQ information associated with the SCI) with a HARQ process in the HARQ entity (dedicated) for handling sidelink broadcast reception. The first UE could associate different SCIs with different HARQ processes if the different SCIs are associated with different TBs. The first UE could associate different SCIs with the same HARQ process if the different SCIs are associated with same TBs. The first UE could determine whether the SCI is indicating a sidelink broadcast based on Destination ID in the SCI (e.g. DstID). The first UE could determine whether the SCI is indicating a sidelink broadcast based on no indication of source ID and/or HARQ process ID in the SCI. The first UE could perform sidelink groupcast communication (e.g. receiving sidelink groupcast from one or more UEs).

The first UE could maintain one or more HARQ entities (in a MAC entity for one carrier) for sidelink groupcast, wherein each of the one or more HARQ entities for sidelink groupcast is associated with one (Group) Destination ID and/or one source (Layer-1/Layer-2) ID (e.g. source ID associated with one UE). When the first UE receives a first SCI with DstID_1 and/or SrcID_1 indicating a sidelink groupcast, the first UE could associate the first SCI for groupcast (and TB and HARQ information associated with the SCI) with one of the one or more HARQ entities associated with DstID1 and/or SrcID1 (e.g. first HARQ entity for groupcast). The first UE could associate the first SCI for groupcast (and TB and HARQ information associated with the SCI) with a HARQ process in the first HARQ entity for groupcast. The first UE could associate the first SCI for groupcast with the HARQ process based on the HARQ process number indicated by the first SCI (e.g. HARQ process_num_1).

When the first UE receives a second SCI with DstID_2 and/or SrcID_2 indicating a sidelink groupcast, the first UE could associate the second SCI (and TB and HARQ information associated with the second SCI) with one of the one or more HARQ entities associated with DstID_2 and/or SrcID_2 (e.g. second HARQ entity for groupcast). The first UE could associate the second SCI for groupcast (and TB and HARQ information associated with the second SCI) with a HARQ process in the second HARQ entity for groupcast. The first UE could associate the second SCI for groupcast with the HARQ process based on the HARQ process number indicated by the second SCI (e.g. HARQ process_num_2). In other words, if the HARQ process number indicated by the second SCI with DstID_2 and/or SrcID_2 is different from HARQ process_num_2, the first UE could associate the second SCI to the second HARQ entity for groupcast with a different HARQ process other than HARQ process_num_2.

When the first UE receives a third SCI with DstID_1 and/or SrcID_2 indicating a sidelink groupcast, the first UE could associate the third SCI (and TB and HARQ information associated with the third SCI) with one of the one or more HARQ entities associated with DstID_1 and/or SrcID_2 (e.g. third HARQ entity for groupcast). The first UE could associate the third SCI for groupcast (and TB and HARQ information associated with the third SCI) with a HARQ process in the third HARQ entity for groupcast. The first UE could associate the third SCI for groupcast with the HARQ process (in the third HARQ entity for groupcast) based on the HARQ process number indicated by the third SCI (e.g. HARQ process_num_2).

The first UE could maintain one or more HARQ entities (in a MAC entity) for sidelink unicast, wherein each of the one or more HARQ entities for sidelink unicast is associated with one (Group) Destination ID and/or one source (Layer-1/Layer-2) ID (e.g. source ID associated with one UE). When the first UE receives a first SCI with DstID_A and/or SrcID_A indicating a sidelink unicast, the first UE could associate the first SCI for unicast (and TB and HARQ information associated with the SCI) with one of the one or more HARQ entities associated with DstID_A and/or SrcID_A (e.g. first HARQ entity for unicast). The first UE could associate the first SCI for unicast (and TB and HARQ information associated with the SCI) with a HARQ process in the first HARQ entity for unicast. The first UE could associate the first SCI for unicast with the HARQ process based on the HARQ process number indicated by the first SCI for unicast (e.g. HARQ process_num_A).

When the first UE receives a second SCI with DstID_B and/or SrcID_B indicating a sidelink unicast, the first UE could associate the second SCI for unicast (and TB and HARQ information associated with the second SCI) with one of the one or more HARQ entities associated with DstID_B and/or SrcID_B (e.g. second HARQ entity for unicast). The first UE could associate the second SCI for unicast (and TB and HARQ information associated with the second SCI) with a HARQ process in the second HARQ entity for unicast. The first UE could associate the second SCI for unicast with the HARQ process based on the HARQ process number indicated by the second SCI (e.g. HARQ process_num_B).

Additionally or alternatively, the first UE could maintain a HARQ entity for sidelink broadcast transmission (in one carrier). The first UE could maintain one or more HARQ entities for sidelink unicast transmission (for one carrier). Each of the one or more HARQ entities for sidelink unicast transmission could be associated with a pair of (Layer-1 or Layer-2) destination ID and source ID. The first UE could maintain one or more HARQ entities for sidelink groupcast transmission (for one carrier). Each of the one or more HARQ entities for sidelink groupcast transmission could be associated with a pair of (Layer-1 or Layer-2) destination ID and source ID.

Figure 7:
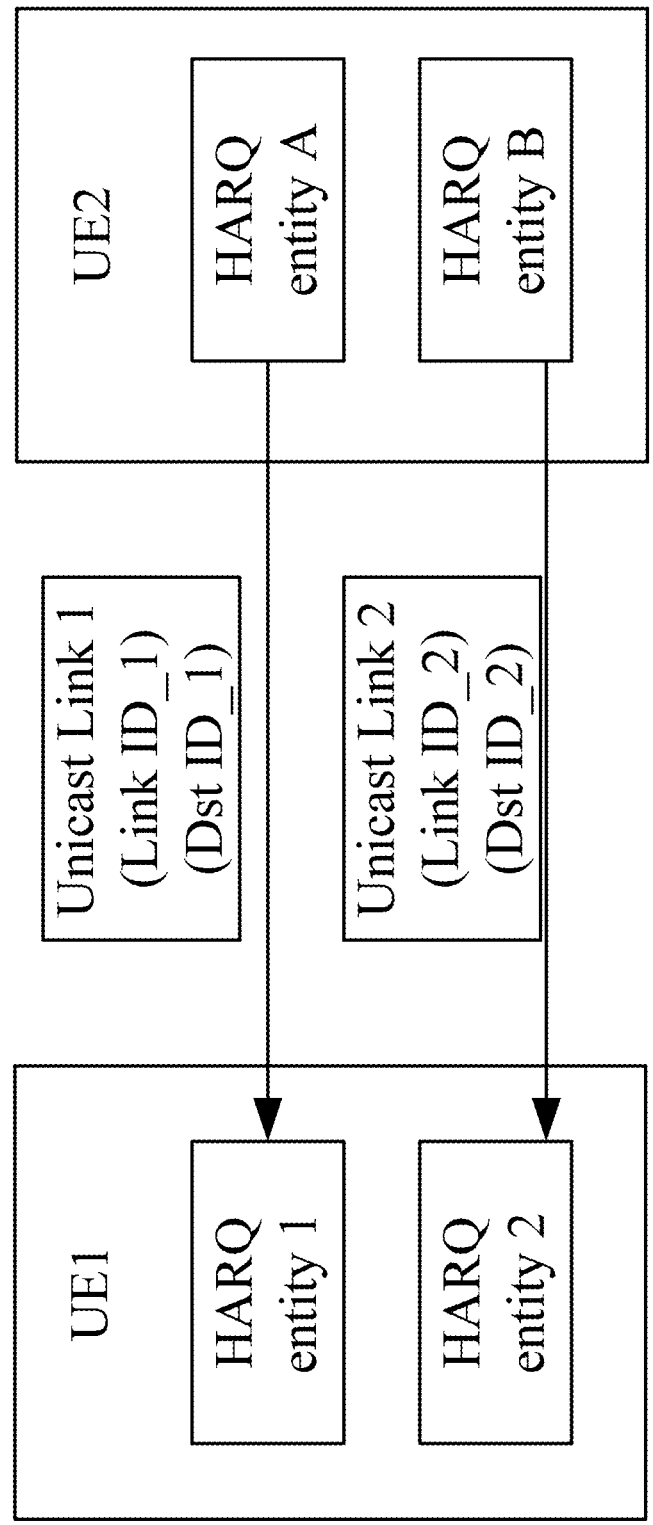
FIG. 7 is a diagram according to one exemplary embodiment.

Another illustration of the first concept is shown in FIG. 7. FIG. 7 illustrates an example UE1 performs multiple sidelink unicast links or transmissions with UE2. UE1 could perform two sidelink unicasts with UE2 (on a single carrier). The two sidelink unicast links or transmissions could be associated with different Link ID (e.g. link identifier) and/or destination ID. UE1 could maintain two HARQ entities for handling the two sidelink unicast links or transmissions. When UE1 receives SCI or TB from UE2 via a unicast link, UE1 could associate the SCI or TB with one of the HARQ entities based on link and/or destination ID associated with the SCI or TB.

Second Concept

In a second concept, a UE could maintain one HARQ entity for handling (all) sidelink unicast, groupcast, and could broadcast (in one carrier or frequency) with other UEs. The UE could maintain one or more broadcast HARQ processes, wherein the one or more broadcast HARQ processes could be associated with SCI or TB associated with sidelink broadcast. The UE could associate different SCI or TBs with different broadcast HARQ processes. The UE could associate SCIs indicating a same TB to the same broadcast HARQ process (e.g. SCIs associated with blind retransmission of the same TB). The UE could maintain one or more unicast or groupcast HARQ processes. Each of the one or more unicast or groupcast HARQ process could be associated with a unicast or groupcast reception. The UE could associate a (received) SCI with a unicast or groupcast HARQ process at least based on source ID and/or destination ID indicated in the SCI. The UE could associate different SCIs with the same unicast or groupcast HARQ process if the different SCIs indicate a same TB (e.g. the same SL data). The UE could associate different SCIs with different unicast or groupcast HARQ processes if the SCIs indicate different TBs. The UE could associate different SCIs with different unicast or groupcast HARQ processes if the SCIs indicate different source ID and/or destination ID.

The one or more HARQ processes for unicast and the one or more HARQ processes for groupcast could be the same set of HARQ processes. Alternatively, the one or more HARQ processes for unicast and the one or more HARQ processes for groupcast could be different sets of HARQ processes. The UE could associate a (unicast or groupcast) SCI or TB with a HARQ process at least based on (a combination of) destination ID and/or source ID and/or HARQ process number indicated in the SCI or TB.

Figure 8:
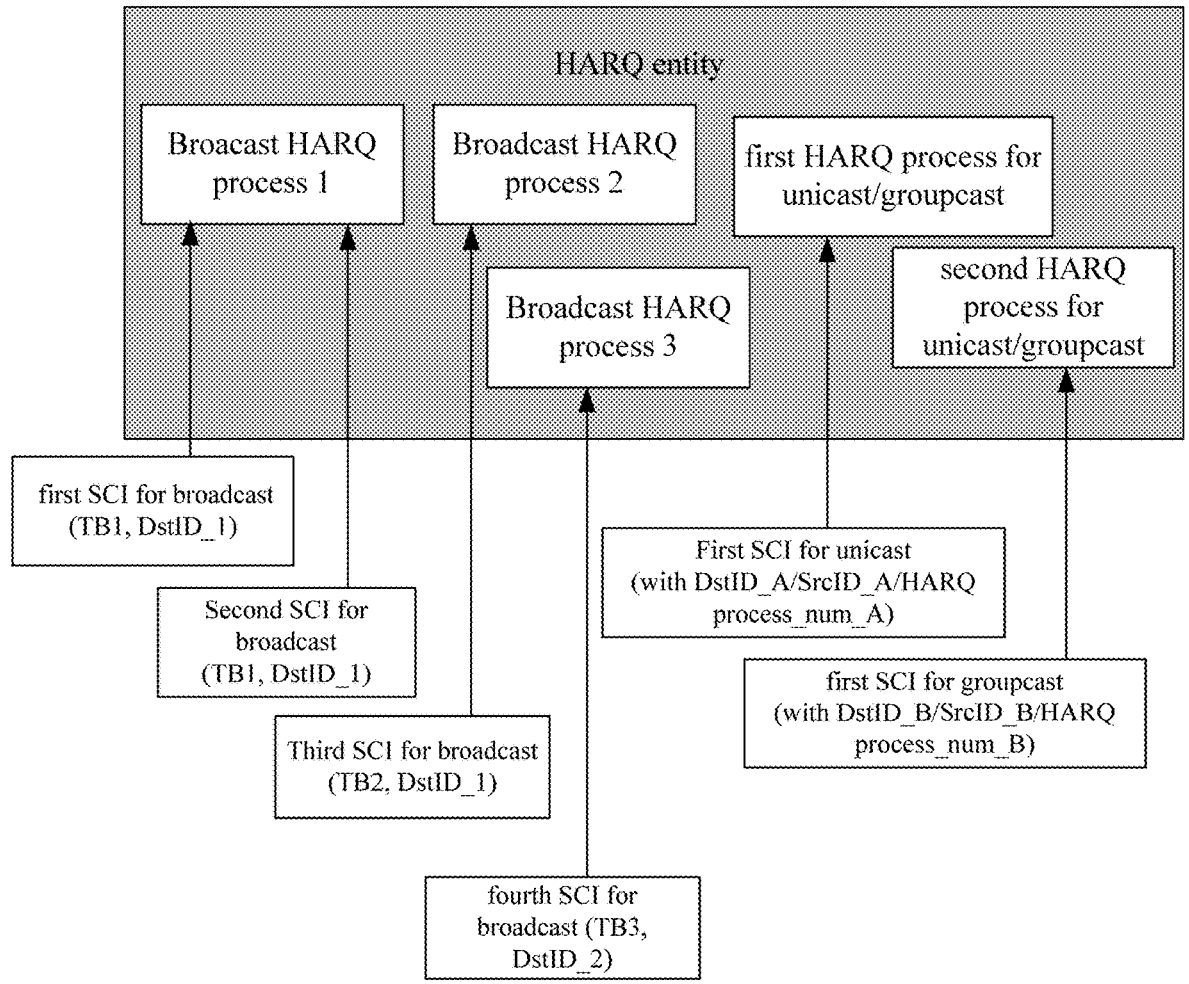
FIG. 8 is a diagram according to one exemplary embodiment.

An illustration of the second concept is shown in FIG. 8. A UE could maintain a HARQ entity for sidelink receptions (regardless of which cast type of the sidelink receptions). When the UE receives a first SCI for broadcast indicating a transmission of TB1 (with Destination ID DstID_1), the UE could associate the first SCI for broadcast with broadcast HARQ process 1. When the UE receives a second SCI for broadcast indicating the (retransmission of) TB1 (with Destination ID DstID_1), the UE could associate the second SCI for broadcast with broadcast HARQ process 1 (e.g. the same as the first SCI) since the second SCI indicates the same TB as the first SCI. When the UE receives a third SCI for broadcast indicating a (transmission of) TB2, the UE could associate the third SCI (and HARQ information or TB associated with the third SCI) with broadcast HARQ process 2. When the UE receives a fourth SCI for broadcast indicating a (transmission of) TB3, the UE could associate the fourth SCI with broadcast HARQ process 3 since the SCI is associated with different TB and different destination ID from the previous SCIs. When the UE receives a first SCI for unicast, the UE could associate the first SCI for unicast with a HARQ process for unicast or groupcast (first HARQ process for unicast or groupcast). When the UE receives a first SCI for groupcast, the UE could associate the first SCI for groupcast with a HARQ process for unicast or groupcast (second HARQ process for unicast or groupcast).

Figure 9:
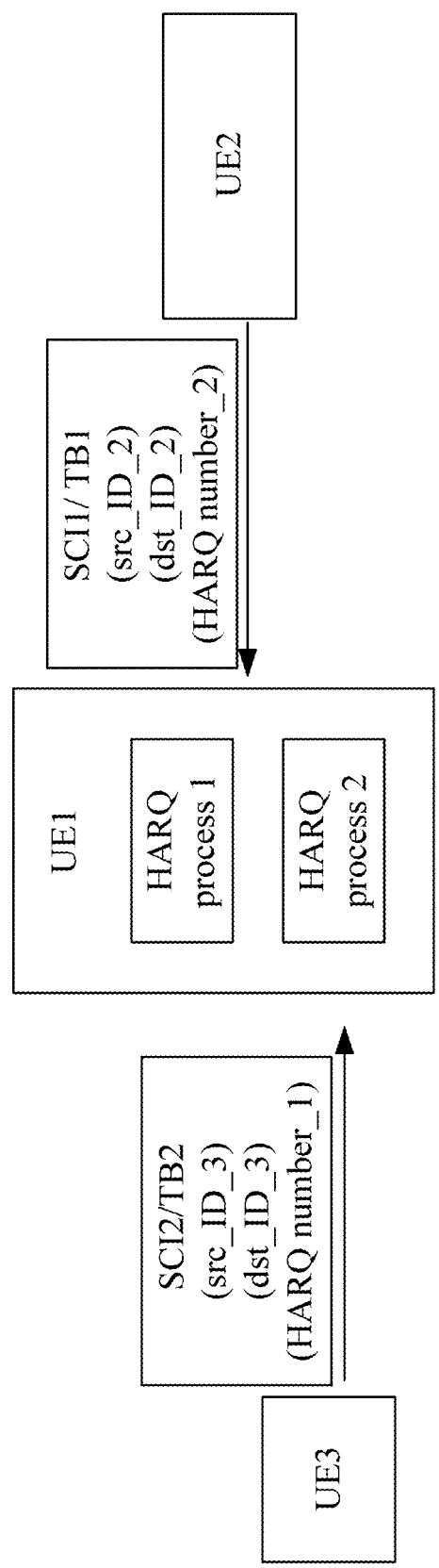
FIG. 9 is a diagram according to one exemplary embodiment.

Another illustration for the second concept is shown in FIG. 9. UE1 could perform sidelink unicast (respectively) with UE2 and UE3 (using one HARQ entity). UE1 could receive SCI1 and TB1 (associated with SCI1) from UE2. SCI1 may indicate source ID (src_ID_2), destination ID (dst_ID_2), and/or HARQ process number (HARQ number_2). UE1 could receive SCI2 and TB2 (associated with SCI2) from UE3. SCI2 could indicate source ID (src_ID_3), destination ID (dst_ID_3), and/or HARQ process number (HARQ number_1). UE1 could associate SCI1 (or TB1) and SCI2 (or TB2) with HARQ process 1 and HARQ process 2 respectively based on source ID, destination ID, and/or HARQ process number. In one example, UE1 determines which HARQ process is associated with SCI1 based on combination (e.g. multiplication or addition) of source ID, destination ID, and HARQ process number indicated by SCI1.

In another example, assuming SCI1 or TB1 is with (src_ID_2) and/or (dst_ID_2) and/or (HARQ number_1). In this example, UE1 could associate SCI1 or TB1 to a HARQ process which is empty or is not used in this time. The HARQ process could be with a HARQ process number which is different from what SCI1 indicates. In this example, UE1 could associate SCI1 or TB1 to HARQ process 2 (since HARQ process number is occupied or in used). In other words, HARQ process number indicated by SCI is a (virtual) HARQ process number. UE1 could associate the indicated HARQ process number to a HARQ process number based on a combination of source ID and/or destination ID.

Third Concept

Figure 10:
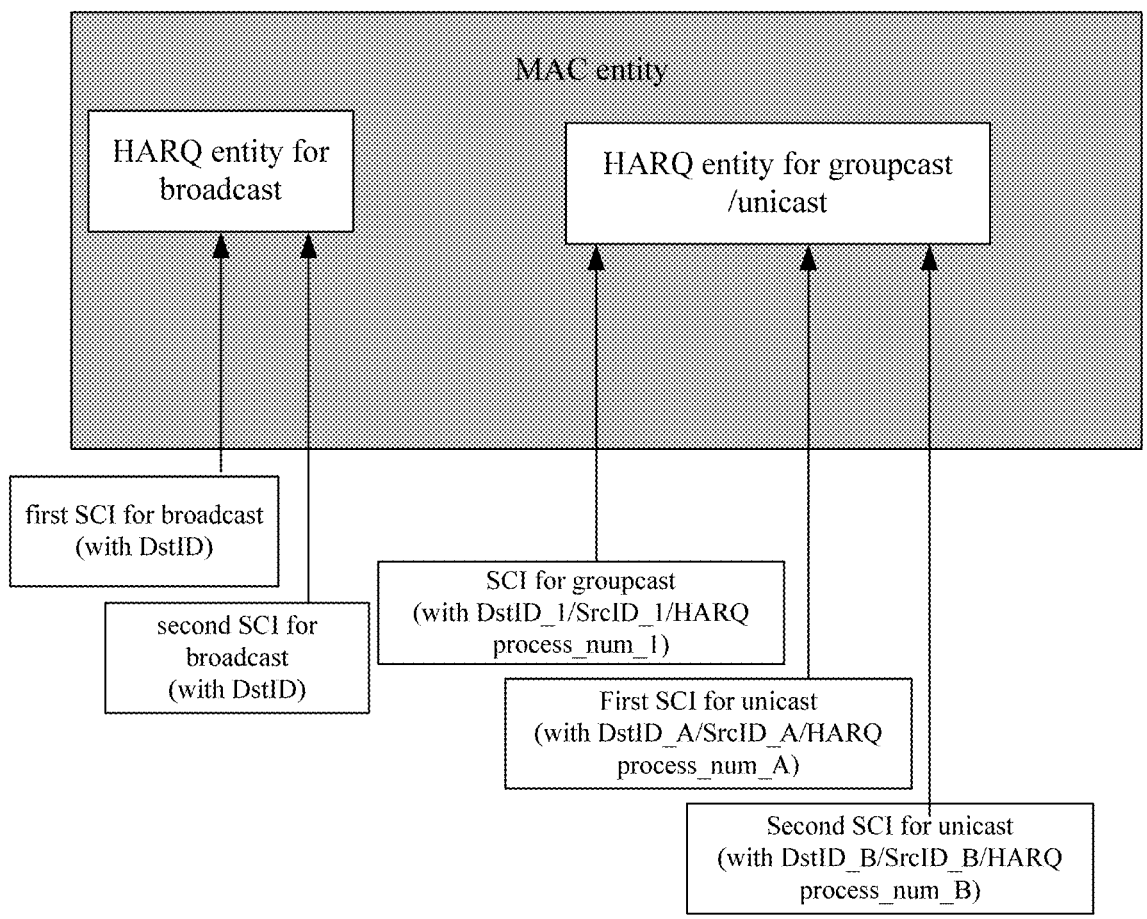
FIG. 10 is a diagram according to one exemplary embodiment.
Figure 11:
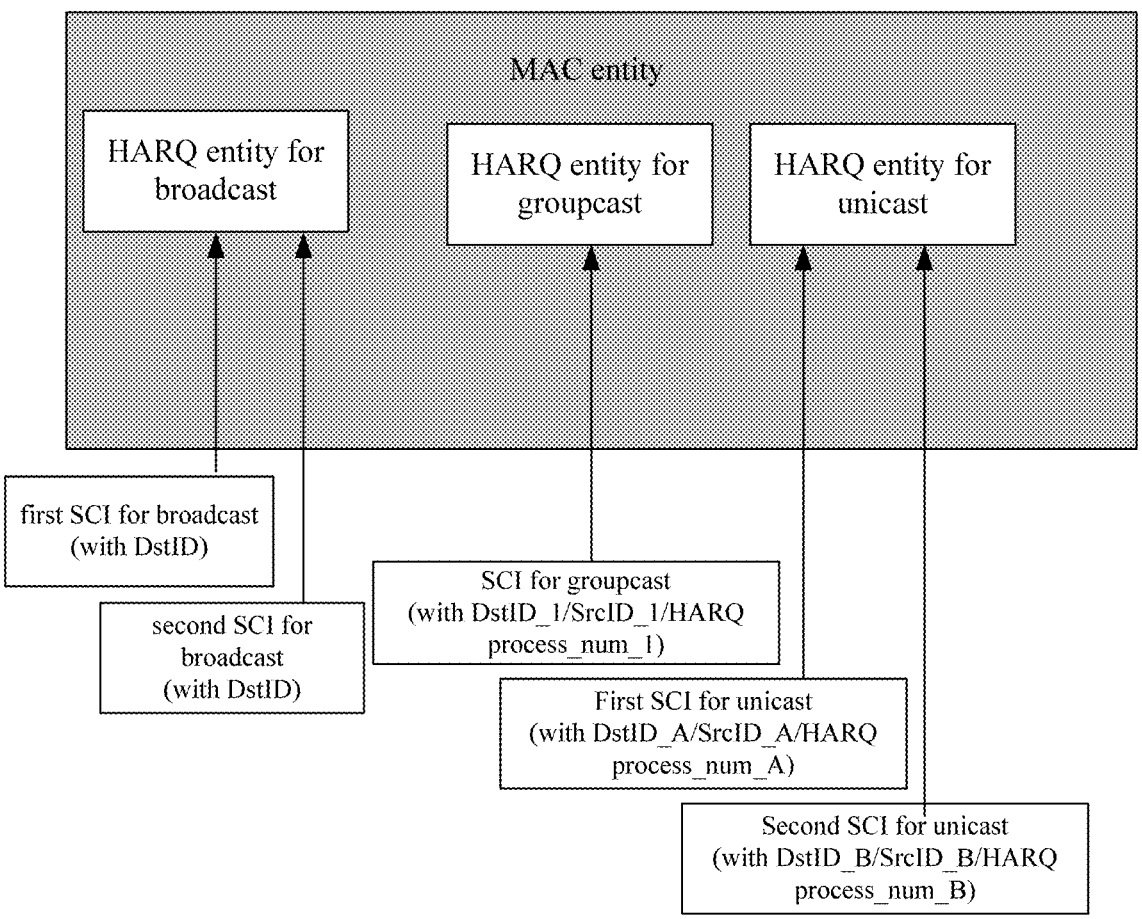
FIG. 11 is a diagram according to one exemplary embodiment.

A third concept is that a UE could maintain a HARQ entity for sidelink broadcast reception. The UE could maintain a HARQ entity for sidelink unicast and groupcast reception. Additionally or alternatively, the UE could maintain a HARQ entity for sidelink unicast and another HARQ entity for groupcast reception. Illustrations of the third concept are shown in FIG. 10 and FIG. 11. The UE could associate a SCI with one of the HARQ entities based on destination ID and/or source ID associated with the SCI. The UE could associate the SCI with a HARQ process based on HARQ number associated with (or indicated in) the SCI.

In 3GPP RAN2 #106 meeting (as captured in the 3GPP RAN2 #106 meeting report), Radio Link Failure (RLF) monitoring for both transmitter UE (Tx UE) and Receiver UE (Rx UE) for Sidelink (SL) unicast communication is agreed. However, detail procedures associated with NR SL RLF declaration is unclear, and it may not be suitable to apply RLF procedures in Uu directly.

For example, according to current specification on Radio link monitoring and Radio Link failure declaration (as discussed in 3GPP TS 38.331) on NR Uu link, when a UE detects a radio link failure with a network, the UE could perform actions and go to RRC_IDLE or initiate connection re-establishment procedure with a network. Some of the actions may not be applicable to SL RLF since the UE may not have a connection problem with the network and therefore no need to leave RRC_CONNECTED mode for Uu. In addition, when the UE declares SL RLF with a second UE, it may be unnecessary for the UE to perform cell reselection (or UE reselection) associated with connection re-establishment since it has no effect on recovering connection with the second UE. In this application, possible behaviors for a sidelink UE in response to SL RLF monitoring or detection are discussed.

One concept is that when a first UE considers a (SL) RLF associated with a second UE to be detected wherein the first UE maintains a (sidelink) MAC or HARQ entity (dedicated) for sidelink (unicast) communication of the second UE, the first UE could perform a combination of following procedures.

In one procedure, the first UE could perform SL MAC reset associated with the MAC entity. Additionally or alternatively, the first UE may not perform SL MAC reset for MAC entities other than the MAC entity associated with the (SL) RLF. Additionally or alternatively, the first UE could perform SL MAC reset for HARQ entity associated with the second UE.

The first UE could stop (all) sidelink transmission or reception from the first UE to the second UE. The UE could initialize variables for logical channel prioritization for sidelink logical channels associated with the second UE.

Additionally or alternatively, the first UE may not stop sidelink transmissions from the first UE to the second UE. The first UE could perform sidelink transmission to the second UE after detection of the (SL) RLF associated with the second UE. For example, the first UE could perform a sidelink transmission to the second UE indicating a RLF regarding an unicast link (from UE2 to UE1).

In another procedure, the first UE could release or suspend (sidelink) radio bearers (configurations) associated with the second UE. The UE could release or suspend (sidelink) RB (configuration) associated with the MAC entity. Additionally or alternatively, the first UE could release or suspend (sidelink) RB (configuration) associated with the HARQ entity (for unicast) associated with the second UE.

In another procedure, the first UE could cancel pending Scheduling Requests associated with the second UE in response to the SL RLF with the second UE. Additionally or alternatively, the UE may not cancel pending SRs in response to detection of SL RLF. Additionally or alternatively, the UE may not cancel pending BSRs associated with the MAC entity (not associated with the second UE) in response to the SL RLF with the second UE. Additionally or alternatively, the UE could cancel pending BSRs associated with the second UE in response to the SL RLF. For example, a SL BSR could be triggered in response to new data arrival associated with the second UE. The first UE could cancel the SL BSR if a SL RLF associated with the second UE is detected or occurs (since the new data is no longer needed to be transmitted). A second SL BSR, associated with the MAC entity, could be triggered in response to new data arrival associated with a third UE. The first UE may not cancel the second SL BSR if a SL RLF associated with the second UE is detected or occurs.

In another procedure, the first UE could stop one or more timers associated with the second UE. Additionally or alternatively, the first UE may not stop one or more timers associated with one or more third UEs other than the second UE, wherein the first UE performs sidelink communications with the one or more third UEs (using the same MAC entity). Additionally or alternatively, the first UE may not stop one or more timers associated with a network, wherein the first UE performs UL or DL communication with the network.

The one or more timers could include retransmission BSR timer for SL, wherein the first UE triggers a regular sidelink BSR in response to the expiration of the retransmission BSR timer for SL. The one or more timers could include periodic BSR timer for SL, wherein the first UE triggers a periodic BSR in response to the expiration of the periodic BSR timer for SL.

The one or more timers could include prohibit SR timer (associated with SR configuration associated with a SL BSR), wherein the first UE does not transmit (signal) a SR associated with SR configuration if the timer is running. Additionally or alternatively, the first UE may not stop the prohibit SR timer if the SR configuration associated with the prohibit SR timer is not (dedicated) for sidelink communication (associated with the second UE).

The one or more timers could include timers associated with discontinuous reception (DRX) for SL (associated with the second UE). Additionally or alternatively, the first UE may not stop the timers associated with discontinuous reception for SL if the timers are not (dedicated) for the second UE.

The one or more timers could include contention resolution timer. The UE may not stop the contention resolution timer if the random access procedure associated with the timer is not initiated in response to a V2X UE.

Handling Random Access (RA) Procedures

In another procedure, the first UE could stop (ongoing) random access procedures associated with the second UE in response to detection of RLF with the second UE. The first UE could flush Msg3 buffer in response to detection of SL RLF associated with the second UE. Additionally or alternatively, the first UE may not stop (ongoing) random access procedures not associated with the second UE in response to the SL RLF with the second UE.

For example, the first UE could initiate a random access procedure to a network in response to maximum transmission of SR associated with the second UE. The first UE could stop the random access procedure if the first UE detects a RLF with the second UE.

In another procedure, the first UE could flush (soft) buffers for SL HARQ processes associated with the second UE. More specifically, the first UE could flush (soft) buffers for SL HARQ processes used for receiving sidelink transmission from the first UE may not flush buffers for SL HARQ processes used for receiving sidelink transmission from UEs other than the second UE. The first UE may not flush soft buffers for DL HARQ processes in response to a RLF associated with SL. For example, the first UE could flush (soft) buffers for SL HARQ processes used for unicast reception in a (sidelink) HARQ entity associated with the second UE. The first UE could flush buffer for SL HARQ processes used for (unicast) transmission in the (sidelink) HARQ entity associated with the second UE.

In another procedure, the first UE could release sidelink resources associated with the second UE. For example, the first UE could release SL SPS configuration or release reserved resources associated with the SL SPS configuration (configured by a network) for performing sidelink transmission with the second UE. Additionally or alternatively, the first UE could release reserved resources using mode-2 (e.g. autonomous resource selection) for performing sidelink transmission with the second UE. Additionally or alternatively, the first UE could use the reserved resources for performing sidelink communication with other UEs.

The first UE could indicate other UEs the release of the resources in response to SL RLF with the second UE. The first UE could indicate the network the release of the resources in response to SL RLF with the second UE.

In another procedure, the first UE could receive information associated with the second UE via a network after detection of the SL RLF with the second UE. Additionally or alternatively, the first UE could receive information associated with the second UE via a third UE (e.g. a relay UE) after detection of the SL RLF.

Figure 12:
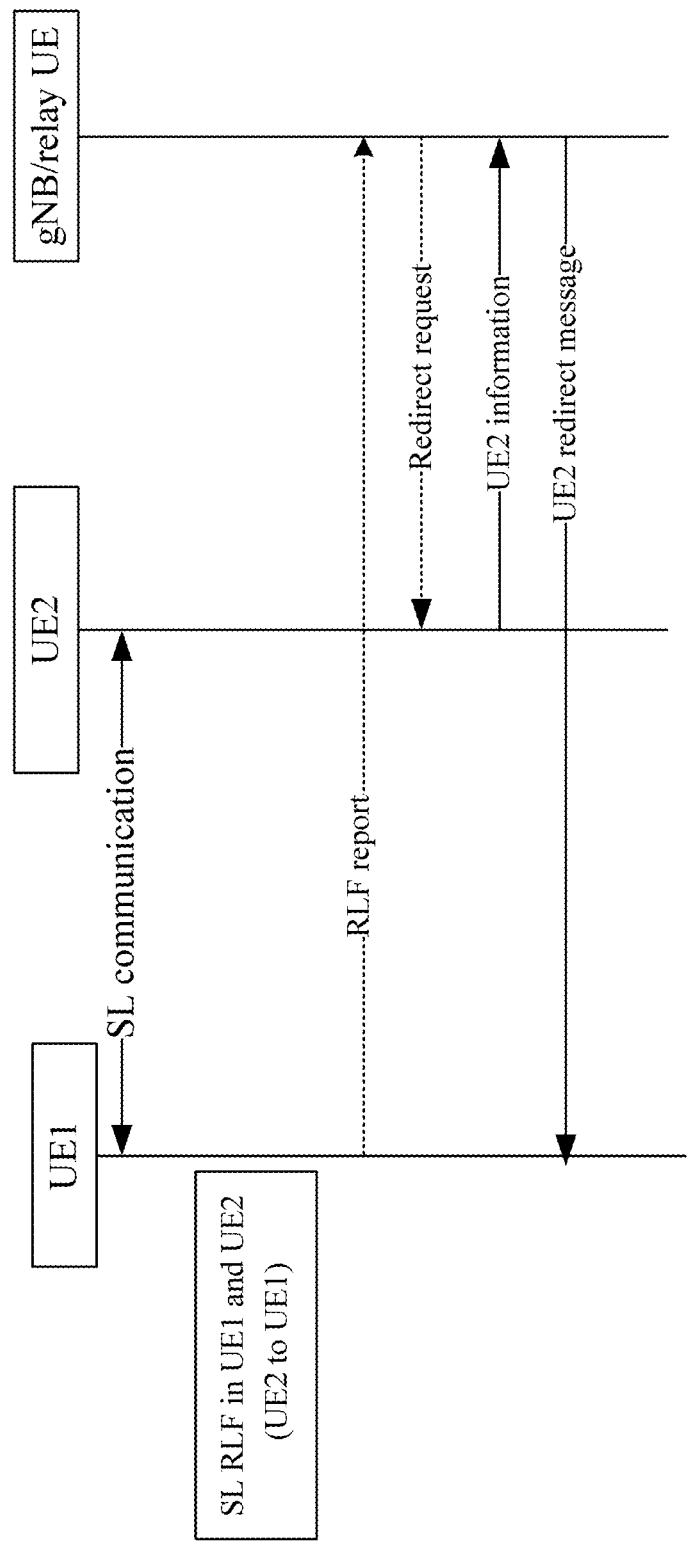
FIG. 12 is a diagram according to one exemplary embodiment.

An example is shown in FIG. 12. UE1 could perform SL communication with UE2. UE1 could detect a SL RLF associated with UE2. UE1 could send a RLF report to a gNB and/or relay UE. The RLF report could indicate SL RLF between UE1 and UE2. The gNB and/or relay UE could send a redirection request to UE2 and receive UE2 information from UE2. The gNB and/or relay UE could transmit a UE2 redirect message to UE1.

The UE2 information could include SL data for UE1. The UE2 information could include SL configuration (e.g. SLRB configuration, MCS, CSI report) associated with UE2. The UE2 information could be transmitted via Uu link and/or PC5 interface. The UE2 redirect message could include UE2 information. The UE2 redirect message could contain SL data from UE2 to UE1. UE1 could perform SL transmission to UE2 via the SL communication (e.g. the UE1 remains SL transmission from UE1 to UE2 after detecting SL RLF from UE2 to UE1). UE2 could transmit data to UE1 via gNB or relay UE.

For all concepts and examples above:

Upper layers of the first UE could indicate in which (Group) Destination IDs the first UE is interested.

The first UE could be a V2X UE. The second UE could be a V2X UE.

The first UE could perform sidelink unicast communication with the second UE.

The first UE could perform sidelink groupcast communication with the second UE.

The first UE could perform sidelink broadcast communication with the second UE.

The sidelink broadcast, unicast and groupcast could be on the same carrier.

The sidelink broadcast, unicast and groupcast could be on different carriers.

The (first) UE could determine whether a received SCI is associated with unicast, broadcast, or groupcast at least based on destination (layer-1 or layer-2) ID and/or source (layer-1/layer-2) ID.

The (first) UE could determine whether a received SCI is associated with unicast, broadcast, or groupcast at least based on whether the SCI indicates a HARQ process number.

Two TBs could be the same TB if the two TBs include the same (SL) data.

When a UE associate SCI with a HARQ process, the UE could direct HARQ information and TB associated with the SCI to the HARQ process.

The UE could maintain a HARQ entity for each pair of destination ID and source ID.

The first UE could be configured with SR configurations (dedicated) for (each) other UEs, wherein the first UE performs sidelink communications with the (each) other UEs.

The second UE could be a Road Side Unit (RSU).

Figure 13:
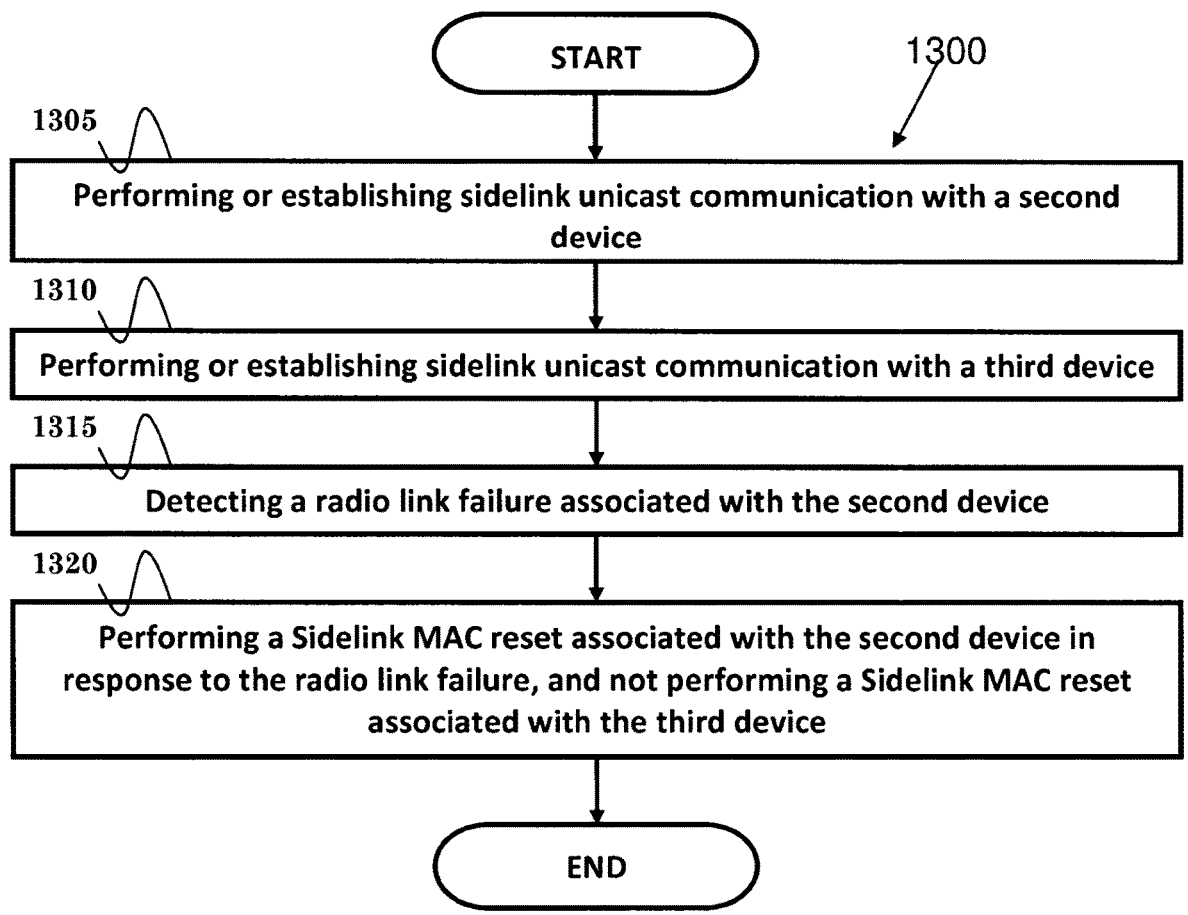
FIG. 13 is a flow chart according to one exemplary embodiment.

FIG. 13 is a flow chart 1300 according to one exemplary embodiment from the perspective of a first device for handling radio link failure. In step 1305, the first device performs or establishes sidelink unicast communication with a second device. In step 1310, the first device performs or establishes sidelink unicast communication with a third device. In step 1315, the first device detects a radio link failure associated with the second device. In step 1320, the first device performs a Sidelink MAC reset associated with the second device in response to the radio link failure, and does not perform a Sidelink MAC reset associated with the third device.

In one embodiment, the Sidelink MAC reset associated with the second device may include or comprise the first device stopping (all) sidelink transmission and/or reception associated with the second device. Preferably or alternatively, the Sidelink MAC reset associated with the second device may not include stopping (all) sidelink transmission and/or reception associated with the third device. The sidelink transmission or reception may include or comprise PSSCH (Physical Sidelink Shared Channel), PSCCH (Physical Sidelink Control Channel), and/or PSFCH (Physical Sidelink Feedback Channel) transmission or reception.

In one embodiment, the Sidelink MAC reset associated with the second device may include or comprise the first device considering one or more timers associated with the second device to be expired. Additionally or alternatively, the Sidelink MAC reset associated with the second device may include or comprise the first device not considering one or more timers associated with the third device to be expired. The Sidelink MAC reset associated with the second device may also include or comprise cancelling (all) pending Scheduling Requests (SRs) and/or Buffer Status Reports (BSRs) associated with the second device. Preferably or alternatively, the Sidelink MAC reset associated with the second device may not include cancelling (all) pending Scheduling Requests (SRs) and/or Buffer Status Reports (BSRs) associated with the third device.

In one embodiment, the Sidelink MAC reset associated with the second device may include or comprise flushing (all) soft buffer associated with sidelink unicast communication with the second device. Preferably or alternatively, the Sidelink MAC reset associated with the second device may not include flushing (all) soft buffer associated with sidelink unicast communication with the third device.

In one embodiment, the Sidelink MAC reset may include releasing sidelink unicast resources associated with the second device scheduled by a network or reserved by the first device. In one embodiment, the first device may maintain one (sidelink) MAC entity for sidelink unicast communication with the second device and sidelink unicast communication with the third device.

Referring back to FIGS. 3 and 4, in one exemplary embodiment of a first device for handling radio link failure. The first device 300 includes a program code 312 stored in the memory 310. The CPU 308 could execute program code 312 to enable the first device (i) to perform or establish sidelink unicast communication with a second device and to perform or establish sidelink unicast communication with a third device, (ii) to detect a radio link failure associated with the second device, and (iii) to perform a Sidelink MAC reset associated with the second device in response to the radio link failure, and not perform a Sidelink MAC reset associated with the third device. Furthermore, the CPU 308 can execute the program code 312 to perform all of the above-described actions and steps or others described herein.

Figure 14:
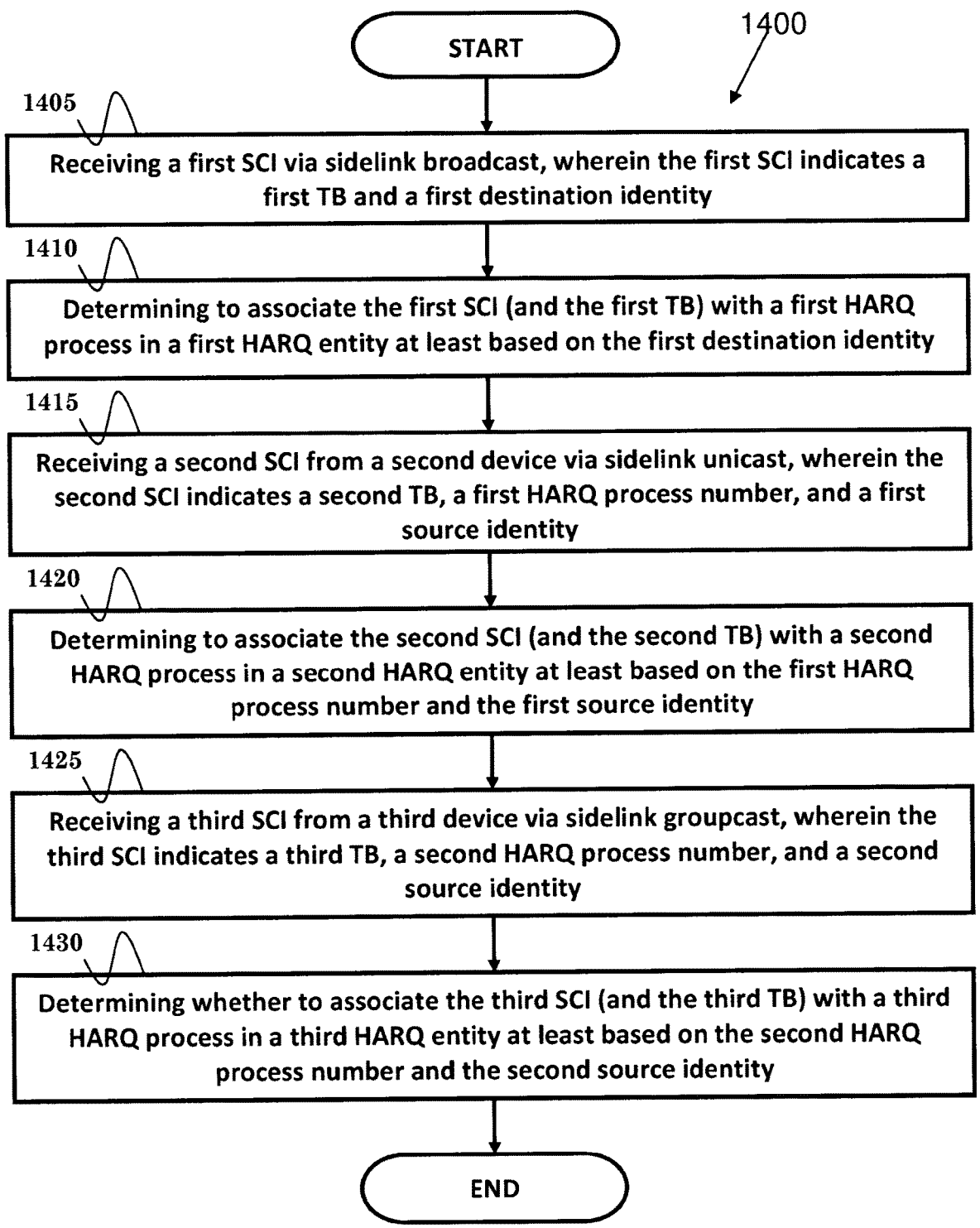
FIG. 14 is a flow chart according to one exemplary embodiment.

FIG. 14 is a flow chart 1400 according to one exemplary embodiment from the perspective of a first device to handle sidelink reception. In step 1405, the first device receives a first SCI via sidelink broadcast, wherein the first SCI indicates a first TB and a first destination identity. In step 1410, the first device determines to associate the first SCI (and the first TB) with a first HARQ process in a first HARQ entity at least based on the first destination identity. In step 1415, the first device receives a second SCI from a second device via sidelink unicast, wherein the second SCI indicates a second TB, a first HARQ process number, and a first source identity. In step 1420, the first device determines to associate the second SCI (and the second TB) with a second HARQ process in a second HARQ entity at least based on the first HARQ process number and the first source identity. In step 1425, the first device receives a third SCI from a third device via sidelink groupcast, wherein the third SCI indicates a third TB, a second HARQ process number, and a second source identity. In step 1430, the first device determines whether to associate the third SCI (and the third TB) with a third HARQ process in a third HARQ entity at least based on the second HARQ process number and the second source identity.

In one embodiment, the first device could determine whether to associate the second SCI and the second TB to the second HARQ process further based on a second destination identity indicated in the second SCI. The first device could also determine whether to associate the third SCI and the third TB to the third HARQ process further based on a third destination identity indicated in the third SCI.

In one embodiment, the first device could receive a fourth SCI from a fourth device via sidelink unicast, wherein the fourth SCI indicates a fourth TB, a third HARQ process number, and a third source identity. Furthermore, the first device could determine whether to associate the fourth SCI (and the fourth TB) with a fourth HARQ process in a fourth HARQ entity at least based on the third HARQ process number. In addition, the first device could determine whether to associate the fourth SCI and the fourth TB to the fourth HARQ process further based on a fourth destination identity indicated in the fourth SCI.

In one embodiment, the fourth HARQ entity could be different from the second HARQ entity if the third source identity is different from the first source identity. The fourth HARQ entity could also be different from the second HARQ entity if the second destination identity is different from the fourth destination identity.

In one embodiment, the fourth HARQ entity could be the second HARQ entity if the third source identity is the same as the first source identity. The fourth HARQ entity could also be the second HARQ entity if the second destination identity is the same as the fourth destination identity.

In one embodiment, the first HARQ entity could be (dedicated) for sidelink broadcast reception. The second HARQ entity could also be (dedicated) for sidelink unicast reception. Furthermore, the third HARQ entity could be (dedicated) for sidelink groupcast reception. In addition, the fourth HARQ entity could be (dedicated) for sidelink unicast reception.

In one embodiment, the first, second, third, or fourth HARQ entity could be associated with one carrier frequency. The second HARQ entity could be the third HARQ entity.

Referring back to FIGS. 3 and 4, in one exemplary embodiment of a first device to handle sidelink reception. The first device 300 includes a program code 312 stored in the memory 310. The CPU 308 could execute program code 312 to enable the first device (i) to receive a first SCI via sidelink broadcast, wherein the first SCI indicates a first TB and a first destination identity, (ii) to determine to associate the first SCI (and the first TB) with a first HARQ process in a first HARQ entity at least based on the first destination identity, (iii) to receive a second SCI from a second device via sidelink unicast, wherein the second SCI indicates a second TB, a first HARQ process number, and a first source identity, (iv) to determine to associate the second SCI (and the second TB) with a second HARQ process in a second HARQ entity at least based on the first HARQ process number and the first source identity, (v) to receive a third SCI from a third device via sidelink groupcast, wherein the third SCI indicates a third TB, a second HARQ process number, and a second source identity, and (vi) to determine whether to associate the third SCI (and the third TB) with a third HARQ process in a third HARQ entity at least based on the second HARQ process number and the second source identity. Furthermore, the CPU 308 can execute the program code 312 to perform all of the above-described actions and steps or others described herein.

Figure 15:
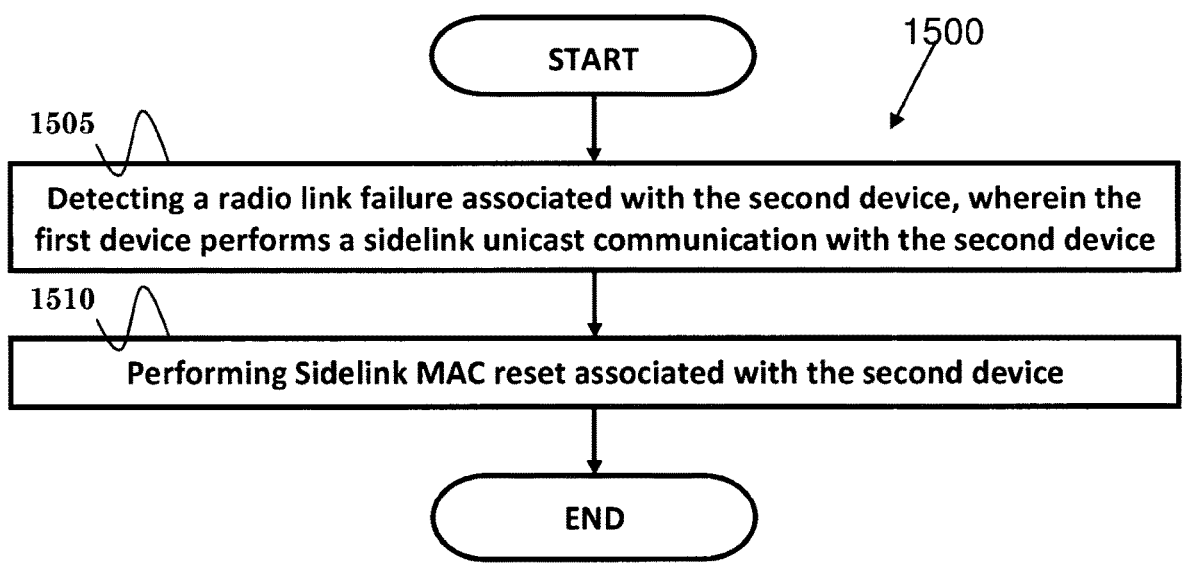
FIG. 15 is a flow chart according to one exemplary embodiment.

FIG. 15 is a flow chart 1500 according to one exemplary embodiment from the perspective of a first device for handling radio link failure with a second device. In step 1505, the first device detects a radio link failure associated with the second device, wherein the first device performs a sidelink unicast communication with the second device. In step 1510, the first device performs Sidelink MAC reset associated with the second device.

In one embodiment, the Sidelink MAC reset may include the first device stopping (all) sidelink transmission associated with the second device. The Sidelink MAC reset may also include the first device stopping (all) sidelink reception associated with the second device.

In one embodiment, the Sidelink MAC reset may include the first device considering one or more timers associated with the second device to be expired. The one or more timers may include SR prohibit timer.

In one embodiment, the Sidelink MAC reset may include the first device stopping any ongoing random access procedure associated with the second device. Alternatively, the Sidelink MAC reset may not include the first device stopping any ongoing random access procedure not associated with the second device. The ongoing random access procedure associated with the second device may be triggered in response to sidelink (unicast) data arrival, wherein the sidelink (unicast) data is associated with second device.

In one embodiment, the Sidelink MAC reset may include the first device cancelling (all) pending SR/BSRs associated with the second device. Alternatively, the Sidelink MAC reset may not include the first device cancelling (all) pending SRs or BSRs not associated with the second device.

In one embodiment, the Sidelink MAC reset may include flushing all soft buffer associated with the second device. Alternatively, the Sidelink MAC reset may not include flushing soft buffer not associated with sidelink (unicast) communication with the second device.

In one embodiment, the Sidelink MAC reset may include release sidelink (unicast) resources associated with the second device. The Sidelink MAC reset may also include release sidelink (unicast) resources scheduled by a network. Furthermore, the Sidelink MAC reset may include release sidelink (unicast) resources reserved by the first device (using autonomous resource selection mode).

In one embodiment, the sidelink transmission or reception associated with the second device may include PSSCH transmission, PSCCH transmission, or PSFCH transmission.

In one embodiment, the first device could detect the radio link failure in response to receiving consecutive "out-of-sync" indication associated with the second device. The destination identity may be Layer-1 or Layer-2 Destination ID. The source identity may be Layer-1 or Layer-2 Source ID.

Referring back to FIGS. 3 and 4, in one exemplary embodiment of a first device for handling radio link failure with a second device. The first device 300 includes a program code 312 stored in the memory 310. The CPU 308 could execute program code 312 to enable the first device (i) to detect a radio link failure associated with the second device, wherein the first device performs a sidelink unicast communication with the second device, and (ii) to perform Sidelink MAC reset associated with the second device. Furthermore, the CPU 308 can execute the program code 312 to perform all of the above-described actions and steps or others described herein.

Figure 16:
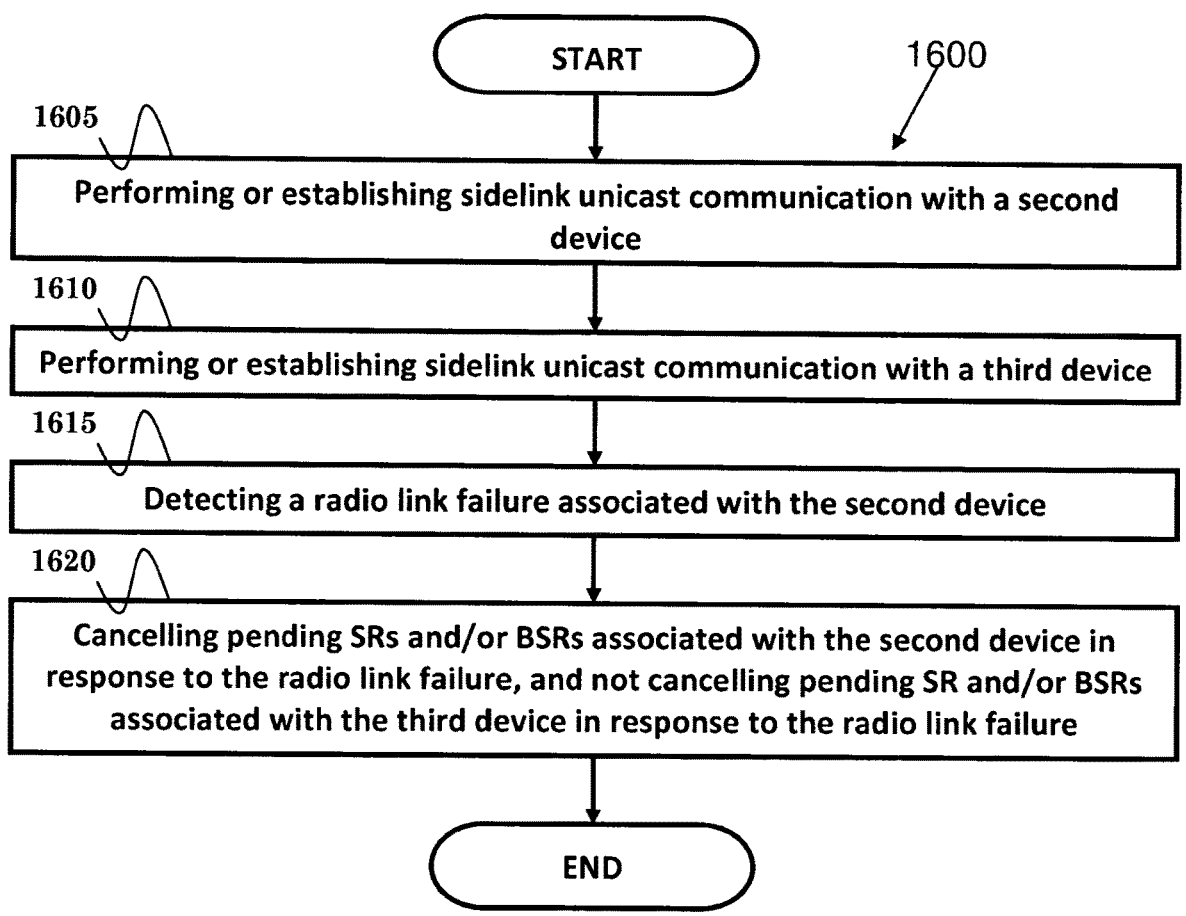
FIG. 16 is a flow chart according to one exemplary embodiment.

FIG. 16 is a flow chart 1600 according to one exemplary embodiment from the perspective of a first device for handling radio link failure. In step 1605, the first device performs or establishes sidelink unicast communication with a second device. In step 1610, the first device performs or establishes sidelink unicast communication with a third device. In step 1615, the first device detects a radio link failure associated with the second device. In step 1620, the first device cancels pending SRs and/or BSRs associated with the second device in response to the radio link failure, and does not cancel pending SR and/or BSRs associated with the third device in response to the radio link failure.

In one embodiment, the first device may stop sidelink transmission and/or reception associated with the second device in response to the radio link failure, and may not stop sidelink transmission and/or reception associated with the third device in response to the radio link failure, wherein the sidelink transmission and/or reception includes PSSCH, PSCCH, and/or PSFCH transmission or reception. The first device may also flush soft buffer associated with sidelink unicast communication with the second device in response to the radio link failure, and does not flush soft buffer associated with sidelink unicast communication with the third device in response to the radio link failure. Furthermore, the first device may maintain one sidelink MAC entity for sidelink unicast communication with the second device and sidelink unicast communication with the third device.

Referring back to FIGS. 3 and 4, in one exemplary embodiment of a first device for handling radio link failure with a second device. The first device 300 includes a program code 312 stored in the memory 310. The CPU 308 could execute program code 312 to enable the first device (i) to perform or establish sidelink unicast communication with a second device, (ii) to perform or establish sidelink unicast communication with a third device, (iii) to detect a radio link failure associated with the second device, and (iv) to cancel pending SRs and/or BSRs associated with the second device in response to the radio link failure, and not cancel pending SR and/or BSRs associated with the third device in response to the radio link failure. Furthermore, the CPU 308 can execute the program code 312 to perform all of the above-described actions and steps or others described herein.

Figure 17:
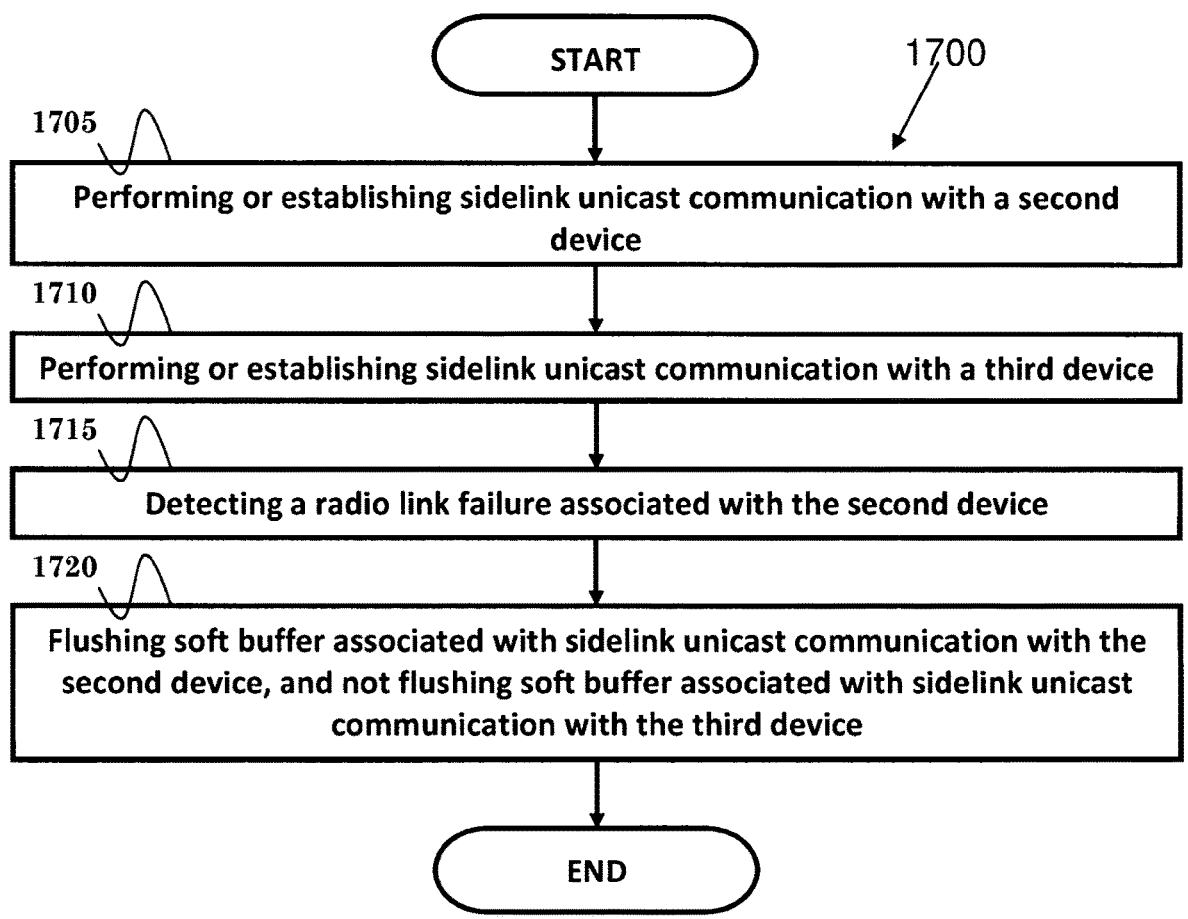
FIG. 17 is a flow chart according to one exemplary embodiment.

FIG. 17 is a flow chart 1700 according to one exemplary embodiment from the perspective of a first device for handling radio link failure. In step 1705, the first device performs or establishes sidelink unicast communication with a second device. In step 1710, the first device performs or establishes sidelink unicast communication with a third device. In step 1715, the first device detects a radio link failure associated with the second device. In step 1720, the first device flushes soft buffer associated with sidelink unicast communication with the second device, and does not flush soft buffer associated with sidelink unicast communication with the third device.

In one embodiment, the first device may cancel pending SRs and/or BSRs associated with the second device in response to the radio link failure, and may not cancel pending SR and/or BSRs associated with the third device in response to the radio link failure. The first device may also stop sidelink transmission and/or reception associated with the second device in response to the radio link failure, and may not stop sidelink transmission and/or reception associated with the third device in response to the radio link failure, wherein the sidelink transmission or reception includes PSSCH, PSCCH, and/or PSFCH transmission or reception. Furthermore, the first device may release sidelink unicast resources associated with the second device scheduled by a network or reserved by the first device in response to the radio link failure. In addition, the first device may maintain one sidelink MAC entity for sidelink unicast communication with the second device and sidelink unicast communication with the third device.

Referring back to FIGS. 3 and 4, in one exemplary embodiment of a first device for handling radio link failure with a second device. The first device 300 includes a program code 312 stored in the memory 310. The CPU 308 could execute program code 312 to enable the first device (i) to perform or establish sidelink unicast communication with a second device, (ii) to perform or establish sidelink unicast communication with a third device, (iii) to detect a radio link failure associated with the second device, and (iv) to flush soft buffer associated with sidelink unicast communication with the second device, and not flush soft buffer associated with sidelink unicast communication with the third device. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a first device handling radio link failure, comprising:
    performing or establishing sidelink unicast communication with a second device, wherein the first device uses a Sidelink Medium Access Control (MAC) entity for the sidelink unicast communication with the second device;
    performing or establishing sidelink unicast communication with a third device, wherein the first device uses the Sidelink MAC entity for the sidelink unicast communication with the third device;
    detecting a radio link failure associated with the second device;
    cancelling pending Scheduling Requests (SRs) and/or Buffer Status Reports (BSRs) associated with the second device in response to the radio link failure, and not cancelling pending SR and/or BSRs associated with the third device in response to the radio link failure; and
    flushing soft buffer associated with the sidelink unicast communication with the second device in response to the radio link failure, and not flushing soft buffer associated with the sidelink unicast communication with the third device in response to the radio link failure.

2. The method of claim 1, wherein the first device stops sidelink transmission and/or reception associated with the second device in response to the radio link failure, and does not stop sidelink transmission and/or reception associated with the third device in response to the radio link failure, wherein the sidelink transmission and/or reception includes PSSCH (Physical Sidelink Shared Channel), PSCCH (Physical Sidelink Control Channel), and/or PSFCH (Physical Sidelink Feedback Channel) transmission or reception.

3. A method of a first device handling radio link failure, comprising:
    performing or establishing sidelink unicast communication with a second device, wherein the first device uses a Sidelink Medium Access Control (MAC) entity for the sidelink unicast communication with the second device;
    performing or establishing sidelink unicast communication with a third device, wherein the first device uses the Sidelink MAC entity for the sidelink unicast communication with the third device;
    detecting a radio link failure associated with the second device; and
    flushing soft buffer associated with the sidelink unicast communication with the second device in response to the radio link failure, and not flushing soft buffer associated with the sidelink unicast communication with the third device in response to the radio link failure.

4. The method of claim 3, wherein the first device cancels pending Scheduling Requests (SRs) and/or Buffer Status Reports (BSRs) associated with the second device in response to the radio link failure, and does not cancel pending SR and/or BSRs associated with the third device in response to the radio link failure.

5. The method of claim 3, wherein the first device stops sidelink transmission and/or reception associated with the second device in response to the radio link failure, and does not stop sidelink transmission and/or reception associated with the third device in response to the radio link failure, wherein the sidelink transmission or reception includes PSSCH (Physical Sidelink Shared Channel), PSCCH (Physical Sidelink Control Channel), and/or PSFCH (Physical Sidelink Feedback Channel) transmission or reception.

6. The method of claim 3, wherein the first device releases sidelink unicast resources associated with the second device scheduled by a network or reserved by the first device in response to the radio link failure.

7. A first device handling radio link failure, comprising:
    a control circuit;
    a processor installed in the control circuit; and
    a memory installed in the control circuit and operatively coupled to the processor;
    wherein the processor is configured to execute a program code stored in the memory to:
        perform or establish sidelink unicast communication with a second device, wherein the first device uses a Sidelink Medium Access Control (MAC) entity for the sidelink unicast communication with the second device;

perform or establish sidelink unicast communication with a third device, wherein the first device uses the Sidelink MAC entity for the sidelink unicast communication with the third device;

detect a radio link failure associated with the second device;

cancel pending Scheduling Requests (SRs) and/or Buffer Status Reports (BSRs) associated with the second device in response to the radio link failure, and not cancel pending SR and/or BSRs associated with the third device in response to the radio link failure; and flush soft buffer associated with the sidelink unicast communication with the second device in response to the radio link failure, and not flush soft buffer associated with the sidelink unicast communication with the third device in response to the radio link failure.

8. The first device of claim 7, wherein the processor is further configured to execute a program code stored in the memory to:

stop sidelink transmission and/or reception associated with the second device in response to the radio link failure, and not stop sidelink transmission and/or reception associated with the third device in response to the radio link failure, wherein the sidelink transmission and/or reception includes PSSCH (Physical Sidelink Shared Channel), PSCCH (Physical Sidelink Control Channel), and/or PSFCH (Physical Sidelink Feedback Channel) transmission or reception.

9. A first device handling radio link failure, comprising:

a control circuit;

a processor installed in the control circuit; and a memory installed in the control circuit and operatively coupled to the processor;

wherein the processor is configured to execute a program code stored in the memory to:

perform or establish sidelink unicast communication with a second device, wherein the first device uses a Sidelink Medium Access Control (MAC) entity for the sidelink unicast communication with the second device;

perform or establish sidelink unicast communication with a third device, wherein the first device uses the Sidelink MAC entity for the sidelink unicast communication with the third device;

detect a radio link failure associated with the second device; and flush soft buffer associated with the sidelink unicast communication with the second device in response to the radio link failure, and not flush soft buffer associated with the sidelink unicast communication with the third device in response to the radio link failure.

10. The first device of claim 9, wherein the processor is further configured to execute a program code stored in the memory to:

cancel pending Scheduling Requests (SRs) and/or Buffer Status Reports (BSRs) associated with the second device in response to the radio link failure, and not cancel pending SR and/or BSRs associated with the third device in response to the radio link failure.

11. The first device of claim 9, wherein the processor is further configured to execute a program code stored in the memory to:

stop sidelink transmission and/or reception associated with the second device in response to the radio link failure, and not stop sidelink transmission and/or reception associated with the third device in response to the radio link failure, wherein the sidelink transmission or reception includes PSSCH (Physical Sidelink Shared Channel), PSCCH (Physical Sidelink Control Channel), and/or PSFCH (Physical Sidelink Feedback Channel) transmission or reception.

12. The first device of claim 9, wherein the processor is further configured to execute a program code stored in the memory to:

release sidelink unicast resources associated with the second device scheduled by a network or reserved by the first device in response to the radio link failure.

* * * * *